Figure 1:
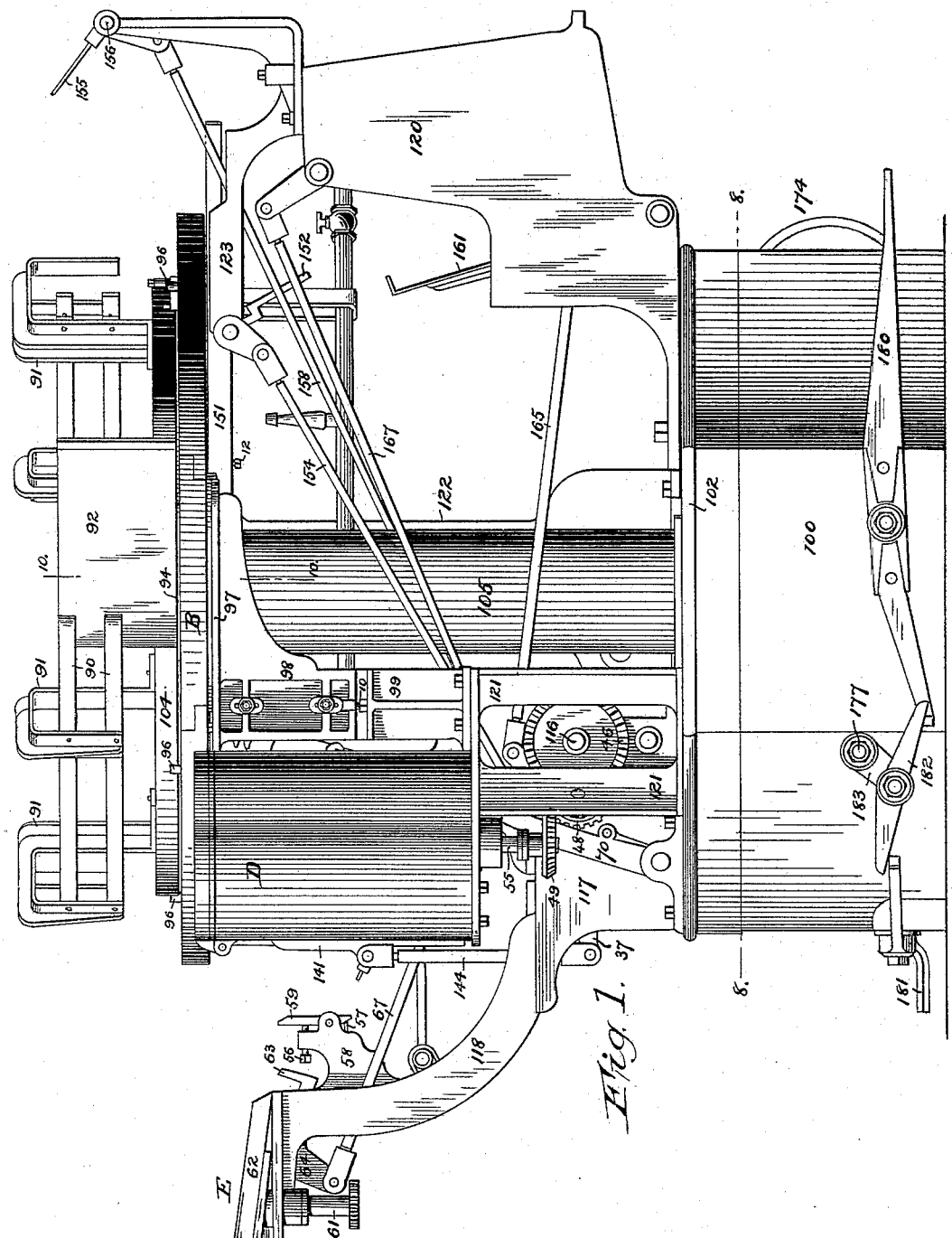

(No Model.)

H. L. ARNOLD.
BOOK COVERING MACHINE.

No. 493,959.

13 Sheets—Sheet 2.

Patented Mar. 21, 1893.

WITNESSES:

INVENTOR

Horace L. Arnold

BY

Geo. H. Graham

ATTORNEY.

(No Model.) 13 Sheets—Sheet 3.

H. L. ARNOLD.
BOOK COVERING MACHINE.

No. 493,959. Patented Mar. 21, 1893.

Inventor:
Horace L. Arnold
by Geo. H. Graham
his Attorney

Witnesses:

(No Model.) 13 Sheets—Sheet 4.

H. L. ARNOLD.
BOOK COVERING MACHINE.

No. 493,959. Patented Mar. 21, 1893.

Witnesses:
C. W. Benjamin
Hettie Marler

Inventor:
Horace L. Arnold,
by Geo. H. Graham
his Attorney.

(No Model.) 13 Sheets—Sheet 6.
H. L. ARNOLD.
BOOK COVERING MACHINE.

No. 493,959. Patented Mar. 21, 1893.

Witnesses:
C. W. Benjamin
Nettie Marler

Inventor,
Horace L. Arnold,
by Geo. H. Graham
his Attorney.

(No Model.)  13 Sheets—Sheet 8.

H. L. ARNOLD.
BOOK COVERING MACHINE.

No. 493,959. Patented Mar. 21, 1893.

Witnesses:
C. W. Benjamin
Nettie Marler

Inventor:
Horace L. Arnold,
by Geo. H. Graham
his Attorney.

(No Model.) 13 Sheets—Sheet 9.

H. L. ARNOLD.
BOOK COVERING MACHINE.

No. 493,959. Patented Mar. 21, 1893.

Witnesses
C. W. Benjamin
Nettie Marler

Inventor:
Horace L. Arnold,
by Geo. H. Graham atty

THE NORRIS PETERS CO., PHOTO-LITHO., WASHINGTON, D. C.

(No Model.) 13 Sheets—Sheet 10.

H. L. ARNOLD.
BOOK COVERING MACHINE.

No. 493,959. Patented Mar. 21, 1893.

Witnesses:
C. W. Benjamin
Nettie Marler

Inventor.
Horace L. Arnold,
by Geo. H. Graham, Atty.

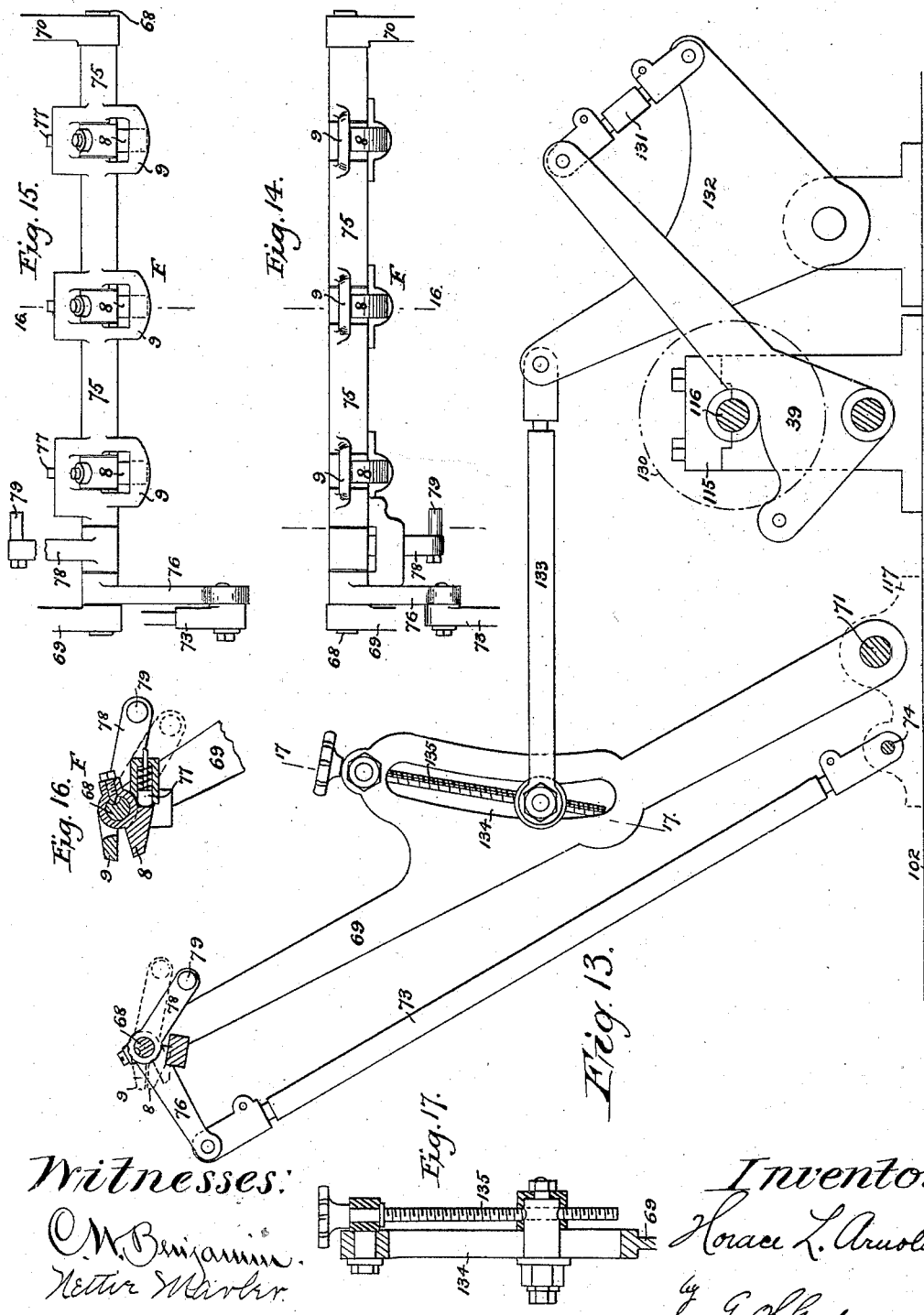

(No Model.) 13 Sheets—Sheet 12.
H. L. ARNOLD.
BOOK COVERING MACHINE.
No. 493,959. Patented Mar. 21, 1893.
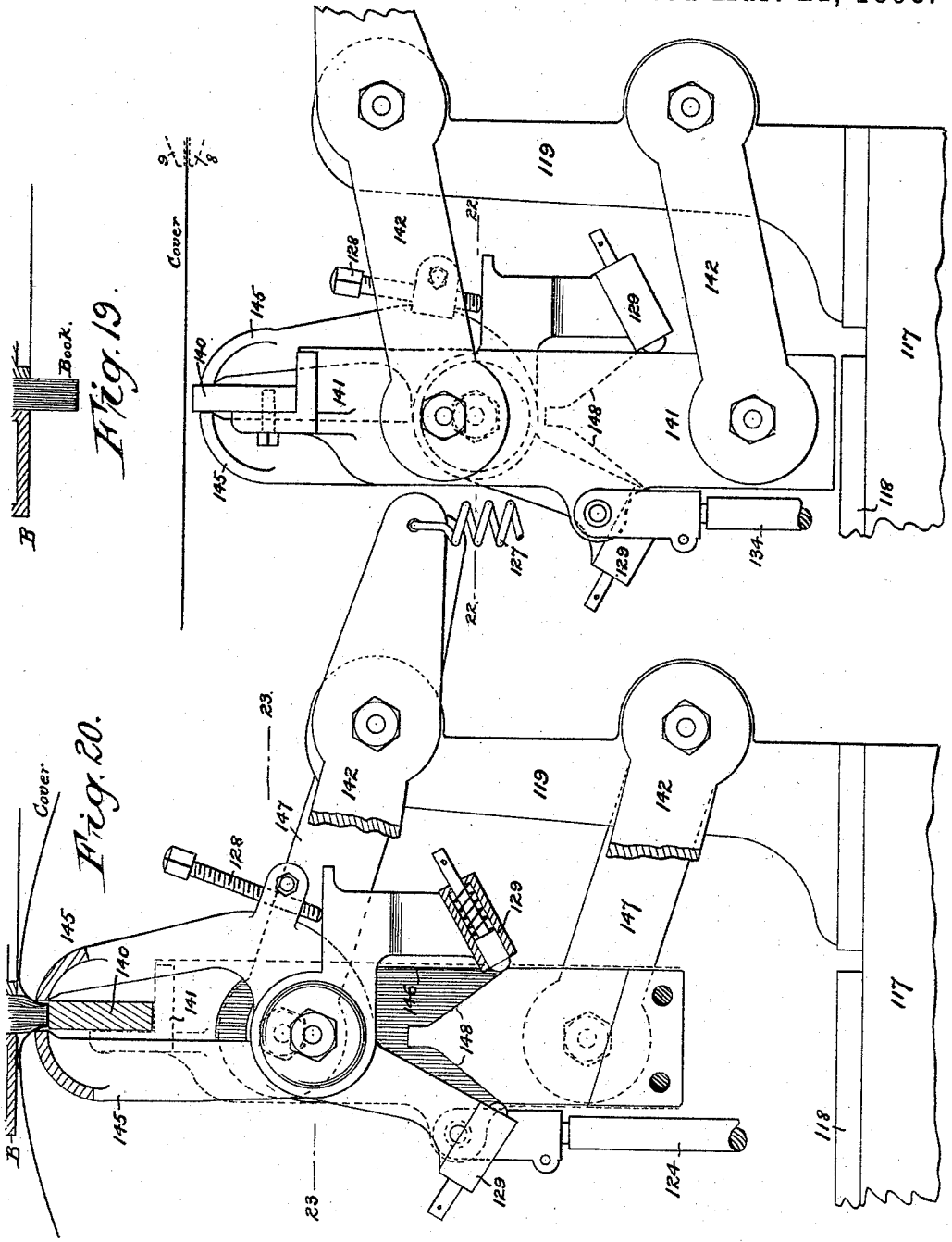
Witnesses:
C. W. Benjamin
Nettie Marler
Inventor.
Horace L. Arnold
by Geo. H. Graham
Atty.

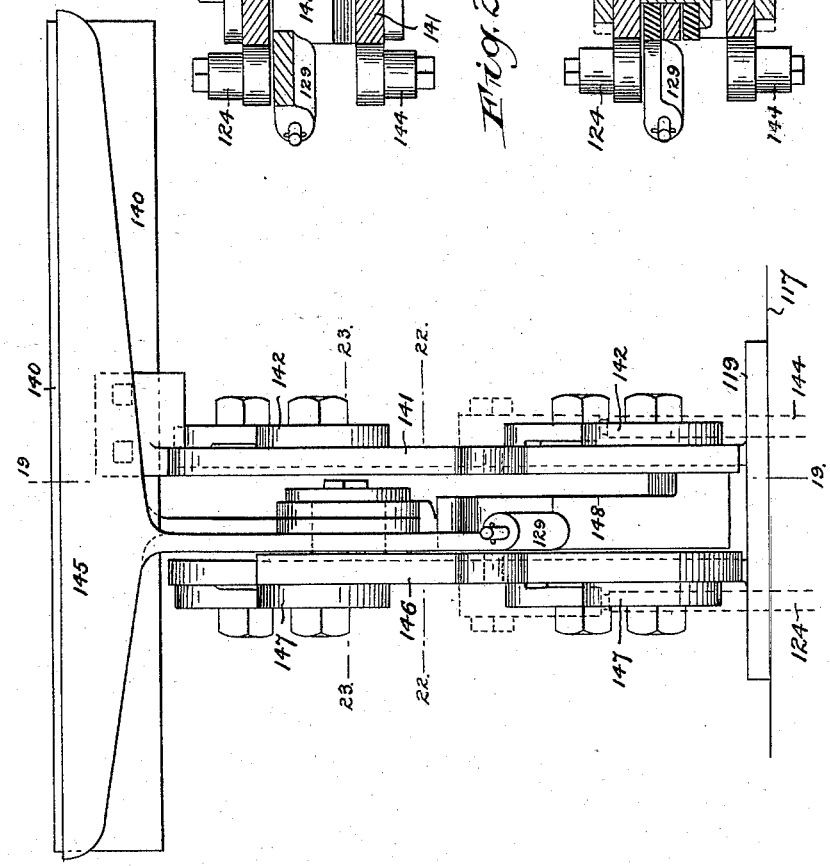

UNITED STATES PATENT OFFICE.

HORACE L. ARNOLD, OF BROOKLYN, NEW YORK, ASSIGNOR OF FIFTY-ONE ONE-HUNDREDTHS TO FERDINAND W. ROEBLING, OF TRENTON, NEW JERSEY.

BOOK-COVERING MACHINE.

SPECIFICATION forming part of Letters Patent No. 493,959, dated March 21, 1893.

Application filed December 27, 1889. Serial No. 335,102. (No model.)

*To all whom it may concern:*

Be it known that I, HORACE L. ARNOLD, a citizen of the United States, residing at Brooklyn, Kings county, State of New York, have invented certain new and useful Improvements in Book-Covering Machines, fully set forth in the following description and represented in the accompanying drawings.

The present invention relates particularly to pamphlet covering machines; that is to say to that class of machines which are adapted to apply a cover to a pamphlet, magazine, book and the like, and firmly secure it thereto in proper register, the object of the invention being among other things to improve the method heretofore followed in covering pamphlets and the like, and to produce an automatic machine that will practically carry out such method in a speedy and economical manner and which shall be capable of covering pamphlets with close uniformity and be equal to the most careful handwork.

To this end the improved method consists in first firmly grasping the pamphlet—hereinafter called the "book"—so that its back or bottom is free to be operated upon, then applying a coating of cement to the book-back, then presenting a cover in its flat condition centrally to the cemented back and pressing the one in contact with the other, then breaking the cover over the corners of the book-back, then smoothing or ironing the back of the cover still in its flat condition upon the book-back, and finally releasing the book with its firmly adhering cover so that the cover flaps may be laid upon the opposite sides of the book.

The improved machine adapted to practically carry out this improved method of covering books, embraces briefly a book-carrier to grasp a book fed to it and present it to the different instrumentalities for completing the covering thereof and delivering the covered book from the machine; a cementing or adhesive material applying device adapted to apply a regulated amount of adhesive material to the back of the book as it is brought in contact therewith in the operation of the book-carrier; a cover-feeder by which the covers are properly and accurately presented in proper position to be applied to the book; a presser for pressing the back of the book and center of the cover together so that the cover will be firmly united thereto by the adhesive quality of the cement previously applied; a smoothing, ironing or drying device against which the back of the book with the adhering cover is borne and smoothed or ironed down as an auxiliary to the action of the presser; and, a delivery device by which the covered books are properly delivered from the machine.

The invention also embraces novel constructions and combinations of parts all of which will be hereinafter fully set forth.

In order to aid a more ready understanding of the improved method and of the construction and operation of the organized machine illustrated—adapted to the carrying out of such method and also embodying the present improvements—it may be premised that such machine consists of a movable book-carrier that is provided with one or more automatic grasping devices by which or by each of which a book is firmly grasped and carried during the operation of applying and securing a cover thereto.

The books and the covers are fed to the machine independently; and in the present embodiment the books are presented to the carrier by an operator—the book-feeder—who sits at the front of the machine in position to place the books one at a time in proper position to be fed to the book-carrier; and the covers are laid in their flat condition upon a feed table located at the left hand side of the machine and at which another operator may sit who simply places the covers one at a time against suitable gages in position to be taken by the cover feeder hereinafter described. It is to be understood, however, that so far as the scope of the present invention is concerned, the books and covers may be fed to the carrying and feeding devices hereinafter described automatically instead of by hand, and certain feeding devices adapted for use in the present organization, as well as in others, will form the subject matter of another application Serial No. 418,634, filed January 20, 1892.

So far as the "books" referred to herein are concerned, they will be in the condition in which they are usually found in book binderies or book making establishments prior to their being covered and need not be otherwise distinguished.

The machine has a temporary book holder on which the operator places the books one at a time on their backs with the head of the book to the right hand, and the loose edges of the book-leaves upward, ready and in position to enter by gravity or be fed into an open grasping device of the book-carrier. When such grasping device arrives in the travel of the carrier immediately below the book resting upon the holder, the latter is quickly moved to one side, so that the book drops into the open grasping device and again rests on its back upon a supporting gage so that the book may be grasped in such manner so to leave its back wholly unobstructed, and projecting beyond the under surface of the carrier. Above the carrier a number of fixed brackets sustain guide strips upon opposite sides of the path traveled by the book within the grasp of the carrier forming a guideway by which the loose upright leaves of the book are supported and held substantially upright while it is in the machine.

In the present organization it has been found desirable to employ an intermittently moving book-carrier so that the latter and the book carried thereby will have a period or periods of rest or dwells during which certain of the covering operations will be performed. Many different ways of intermittently driving the carrier may be adopted, but it has been found preferable to employ the device set forth in United States Letters Patent No. 377,133, to me dated January 31, 1888, by means of which a continuous movement of an operating part of the machine as for instance the driving shaft is converted into an intermittently operating one, as the book-carrier in the present instance. The construction of this mechanism—hereinafter called the book-carrier driver—is such that as many periods of rest or dwells may be provided as there are grasping devices in the carrier, or as may be needed in the covering operations. In the preferred form of such carrier it is a circular and revolving table provided with four sets of book grasping devices located at equal distances apart; and the carrier-driver is so proportioned and arranged that it will provide four periods of rest or dwells in each revolution of the book-carrier. These periods of rest or dwells are utilized in the present machine first, to properly present or feed a book to the grasping device or devices; second, to apply and press the cover to the back of the book; and another, to effect the delivery of the covered book from the carrier. The other period of rest or dwell, which in this organization immediately follows the dwell during which the cover is applied and pressed to the book-back, may be utilized to dry the cement adhesively holding the cover thereto so that when the covered books are delivered from the machine they are completely finished and are ready for delivery or shipment to the market. As the book-carrier is moving to its first dwell, the book is laid with its back on the temporary holder, and immediately the carrier comes to a state of rest a grasping device will be in position to receive a book from the holder. The carrier starts its movement again before the grasping device has closed upon the book so that the rear wall of the opening in which that device is located meets the head of the book and drags the latter for a short distance over the supporting gage; by which operation the heads of the books are always in contact with the extreme right hand end of the grasping device at the time the latter is moved to firmly grasp the book, which it does before the book is moved from off the gage. Thus this end of the grasping device forms a fixed gage by which the location of the covers as they are fed into position may be governed. Between the first dwell and the second the carrier carries the book-back in contact with the cementing device which may consist of a brush revolving in a fountain of adhesive material immediately below the carrier so that the back of the book in passing over the brush receives a coating of that material; the motion of the carrier continuing until it arrives with the book at the point of its second dwell in proper position for the cover to be applied and pressed to the back of the book.

The loose covers are located upon the cover feed-table and each cover is placed by the operator against a head gage—that may be adjusted with respect to the said fixed gage of the grasping device—and the fingers of a front edge gage at front of the table; the cover being thus placed, the grippers of the cover-feeder move outward toward the feed table, soon after the book is grasped by the carrier and grips the front edge of the cover, and while the back of the book referred to is passing in contact with the cementing device carries the cover inwardly away from the feed table until the middle of the cover arrives exactly under the middle of the book-back.

As it is necessary that the machine should be capacitated to cover books of different sizes, and as the size of the cover will vary in accordance with the variation in size of the books means are provided for adjusting the travel of the cover-feeder so that it will feed the cover into proper position with certainty to bring the middle of the cover no matter what its size exactly under the middle of the book-back so that the two flaps of the cover will be even on the book when they are folded against its sides. It should be stated that at the time the carrier arrives with the book at the point where the cover is applied and pressed on, the following grasping device of the carrier when four devices are used, will have arrived in position to have a book fed to it, which it will grasp and carry forward in the same manner as the first one described. The book and the cover first referred to come into position at rest substantially simultaneous with each other, where upon a presser which in the preferred form has a polished face and is heated in any suitable manner, moves against the under side of the cover and presses it strongly against the cemented back of the book so that it is instantly firmly united thereto. The presser corresponds in width to that of the back of the book and is as long as the opening in the grasping device so that it may press upon a book of a length equal to the capacity of said device; in practice a number of pressers will be provided so that one of the proper width may be selected and secured in place before the covering operation of the machine is commenced. The time of the action of the presser is such that it moves the cover in contact with the back of the book at the instant the carrier is brought to its dwell position; or in other words while the book is at rest. By this means and by reason of the accurate movement of the carrier driver it is possible to accurately apply the cover in any position desired with respect to the back of the book, either so that the head of the book and cover will accurately register, or, so that the head of the cover will lap or extend beyond the head of the book to any desired extent. The pressure exerted by the presser it may be stated is sufficient to push the book bodily upward through the grasping device and thus the backs of all the books leave the presser substantially in the same horizontal plane, so that they are in position to be operated upon by the smoothing, ironing or drying device with practically the same pressure, whereby the effect of the covering operation is uniform. This function of the presser renders it possible and the present machine is so organized, to mount the cementing device in a fixed relation with respect the lower surface of the book carrier, and in order to determine or regulate the extent to which the back of the book shall dip into the arc of the revolving cement brush, the supporting gage is made adjustable vertically to allow the back of the book to extend more or less below the carrier as may be necessary to insure the proper application of the cement thereto. As the presser has a definite range of movement the book-backs in leaving it will always occupy a fixed relation to the under surface of the carrier or to the grasping devices.

In conjunction with the presser there is employed a breaker consisting of a pair of jaws one on each side of the presser and held against the sides of the latter by a suitable spring. These breakers are arranged to follow the presser closely in the upward travel of the latter and stand about flush therewith at the time the presser bears the cover against the back of the book, and continuing their motion upward at the time the presser comes to rest at the limit of its upward movement passes beyond the surface of the presser against the two flaps of the cover so as to break or crease the cover over the corners of the back of the book. Immediately prior to this action of the breaker the grippers of the cover-feeder will be opened so that the cover is released therefrom to permit the breaker to act without tearing the cover. The movement of the presser, the release of the cover from the cover-feeder and the action of the breaker occur in close succession and as soon as they are effected the book-carrier may have a small retrograde motion of about a quarter of an inch in extent causing the back of the book with its now adhering cover to be rubbed on the presser which dwells up against it during this time and thus more completely uniting the cover to the book-back than by simple pressure alone. As soon as the book carrier has made this retrograde motion and returned to its original point of dwell, the presser descends rapidly leaving the breaker jaws standing at their highest point of travel so as to form a support for the flaps of the cover to guide them properly over the edge of the smoothing, ironing or drying device, upon the further movement of the book-carrier which then takes place. This smoothing or drying device consists of a plate preferably heated having a polished, plane top surface and adjusted and of such shape that the back of the book with its adhering cover may bear with greater or less pressure upon the same in the further movement of the book-carrier. The action of this plate is to smooth the cover down upon the back of the book so that it will be free from wrinkles of any kind at the same time iron or polish the back of the cover down upon the book-back and if heated rapidly dry the adhesive material so that at the time the covered book is delivered from the machine it will be in merchantable condition. This drying operation of the heated plate is rendered more effective by continuing the plate so that in one of the dwells of the book-carrier the book-back and adhering cover will rest thereon. The book carrier thereupon again moves forward carrying the covered book toward the delivery devices and upon arriving at that point the carrier again dwells, the grasping device is opened releasing the covered book which is thereupon free to move from the carrier into position to be operated upon by the delivery devices.

At the point of delivery of the covered book and below the book and its cover there is a temporary receiving plate that controls the opening through which the covered book must pass to the delivery devices, said plate being in position to support the book during the opening of the grasping device to release it from the carrier. It is preferably employed from the fact that as the opening of the grasping device is gradual the book will be released sooner or later according to its thickness and hence would be liable to drop into the delivery devices in irregular positions were it not for some device to prevent this action. The surface of the plate may occupy a plane just below the surface of the smoothing or drying plate so that as the grasping device is opened before the carrier comes to its dwell position the book is free to move in the carrier and will be moved along on the receiving plate by the wall of the grasping device opening until the book is properly brought upon that plate to pass to the delivery devices at which time the motion of the carrier will have been stopped; whereupon the receiving plate will be moved to one side or dropped suddenly and the book allowed to fall by its own weight through the opening provided by the movement of the receiving plate. The opposite walls of this delivery opening, which is simply large enough to allow the free movement of the book and its cover through it, perform the function of folding or bending back the cover flaps against the sides of the book so that at the time the book rests upon the base of the trough of the delivery devices which is covered with felt to prevent the back of the covered book being marred, the flaps of the cover lie against the sides of the book.

The delivery device consists of a pair of vibrating fly frames lying in different vertical planes and extending toward each other so that in their normal positions at the time the book drops into the delivery trough the fly frames lie upon opposite sides of the book. As the book falls one of its sides rests against the lower fly frame which then rocks inwardly toward the center of the machine; at the same time the upper fly frame also rocks inwardly and sweeps above and beyond the end of the book, when the lower fly frame will then rock to feed the book into the trough resting on its back with one of its sides bearing against the book previously delivered and holds it in that position while the upper fly frame moves downward toward the inward side of the book and meets it and comes to rest; the lower fly frame thereupon moves away from the book inwardly to its normal position ready to act upon the next book dropped into the delivery trough. The book-carrier having thus delivered the covered book the grasping device remaining open continues its movement toward the first dwell where the books are fed thereto when the operations described are repeated. Of course it will be apparent that where the carrier is provided with four grasping devices as in the present instance that at the time the first book fed to the carrier is being delivered properly covered, the fourth book will have been fed to the carrier, the third book will have had the coating of cement applied to its back and its cover in the act of being applied, while the second book and its adhering cover will be resting upon the smoothing or drying plate which upon the next and further movement of the carrier will be delivered in the same manner as the book first referred to.

In the method of covering books thus practiced in the operation of the improved machine the flaps of the cover are not folded against the sides of the book until the covered book passes from the control of the book-carrier so that from the time the cover is applied to the time the grasping devices release the book the flaps of the cover project outward from opposite sides of the back of the book substantially at right angles thereto in the same position they occupy at the time the back of the book and cover were first united. This manner of manipulating the cover enables the grasping devices to continue their hold upon the book without disturbance or disturbing the relation of the book to the carrier which is substantially constant from the time the book is first taken by the carrier until it passes from its control properly covered. As the cover and book-back are firmly united and dried while the former is yet in flat condition, any adhesive material that may have lodged on the book sides will also be dried so that the cover flaps will never become united thereto. With this understanding of the nature and function of the improved machine, a detailed description of the construction and operation will now be given, reference being had to the accompanying drawings, in which:—

Figure 2:
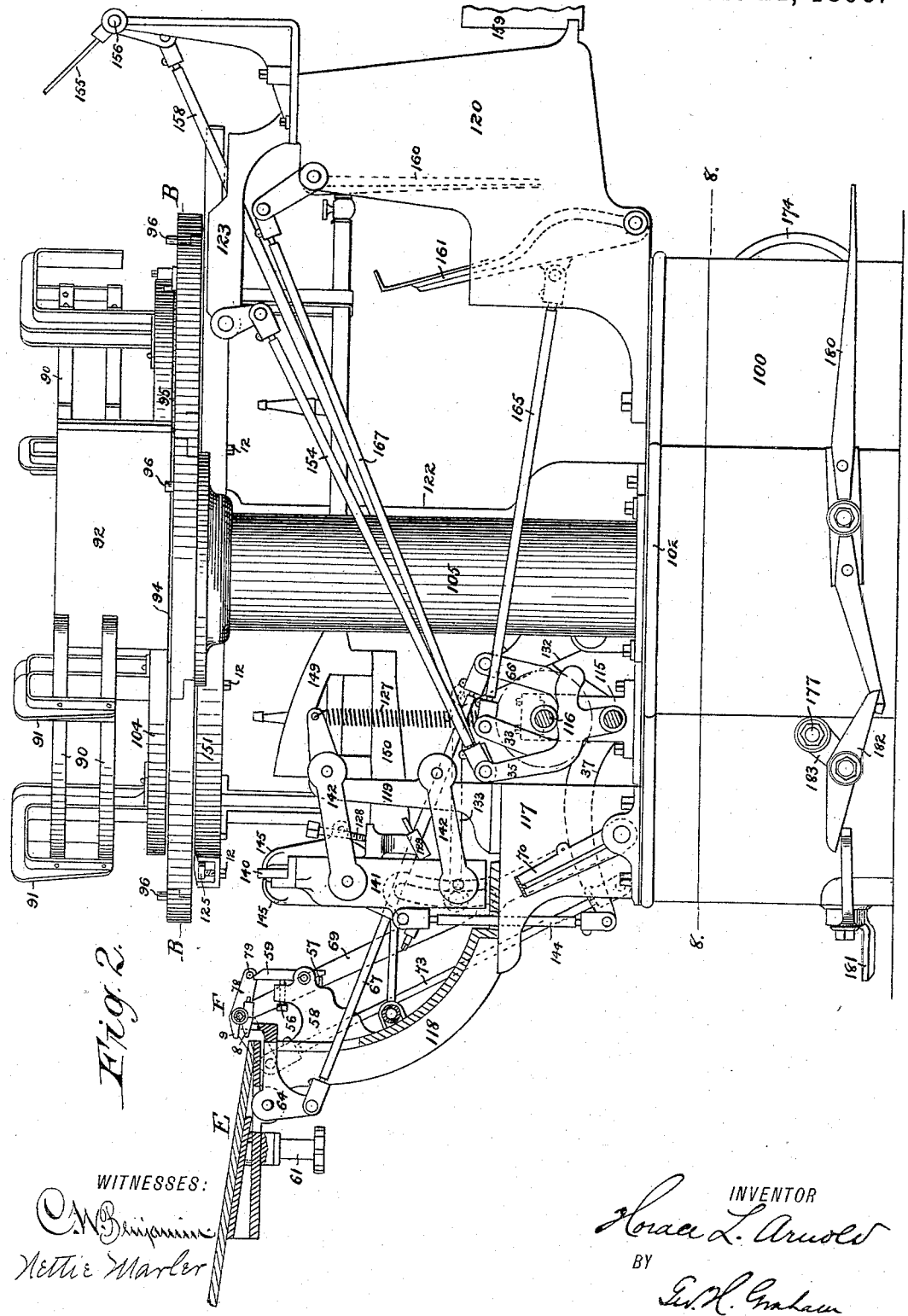
Figure 3:
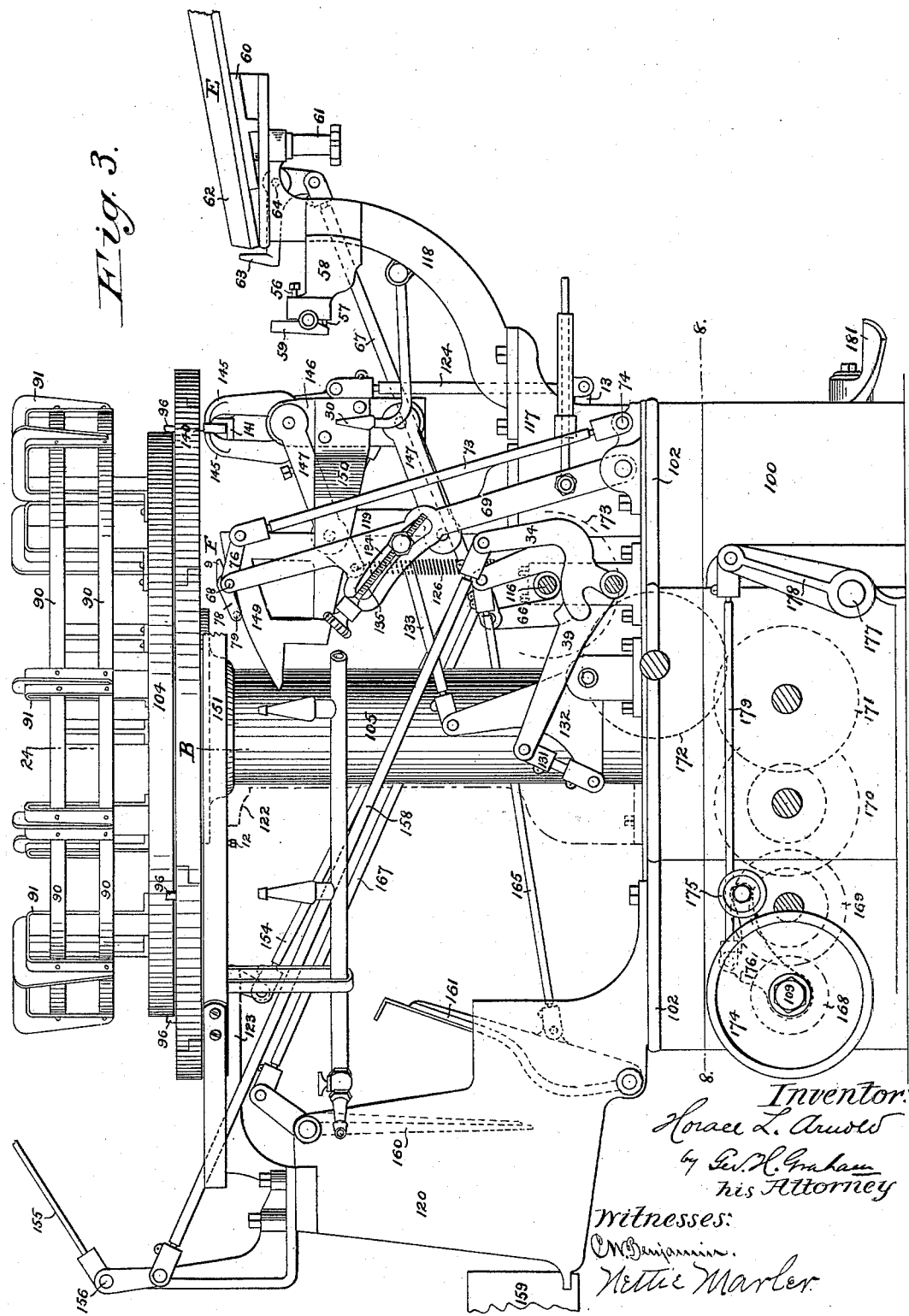
Figure 4:
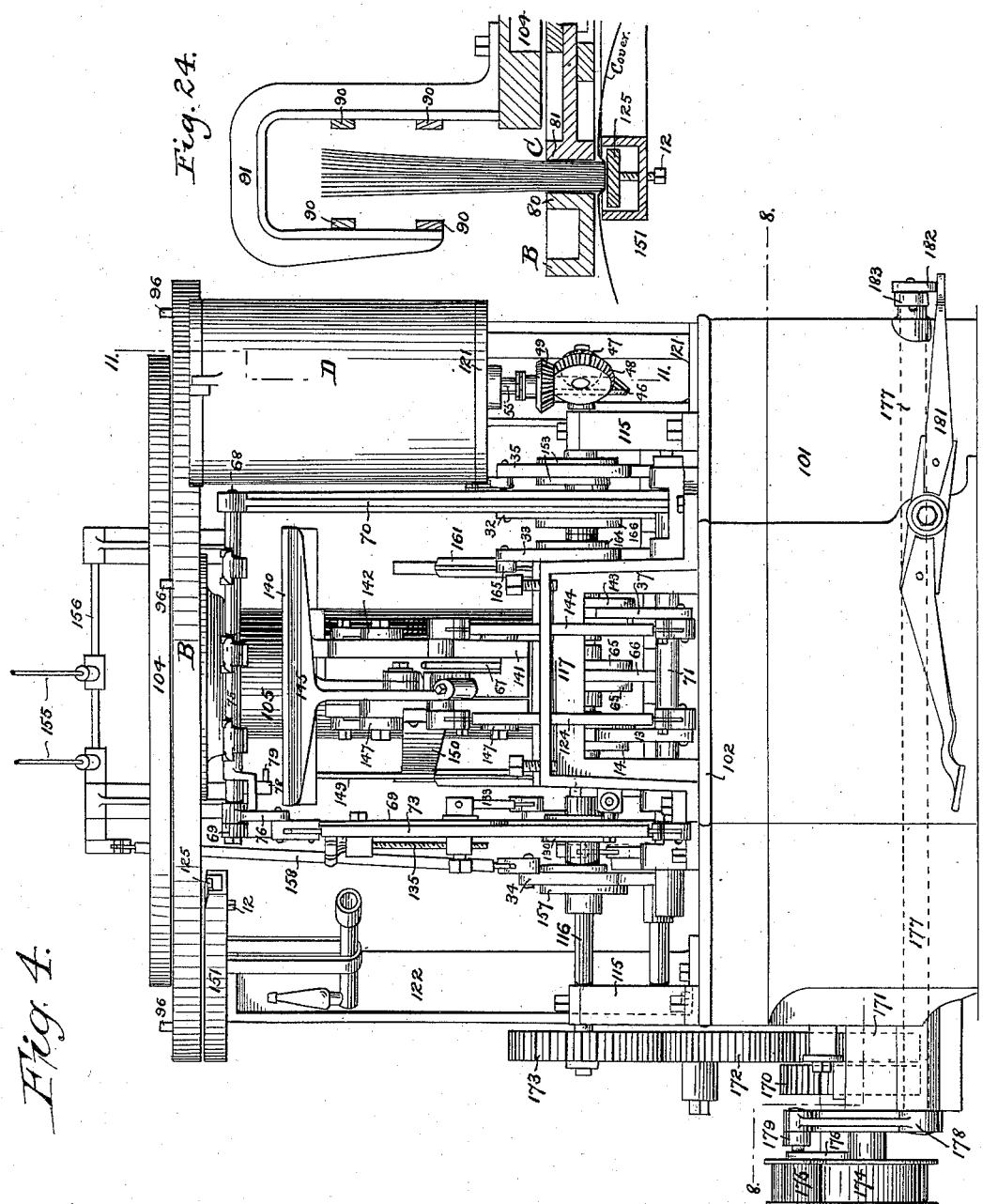
Figure 5:
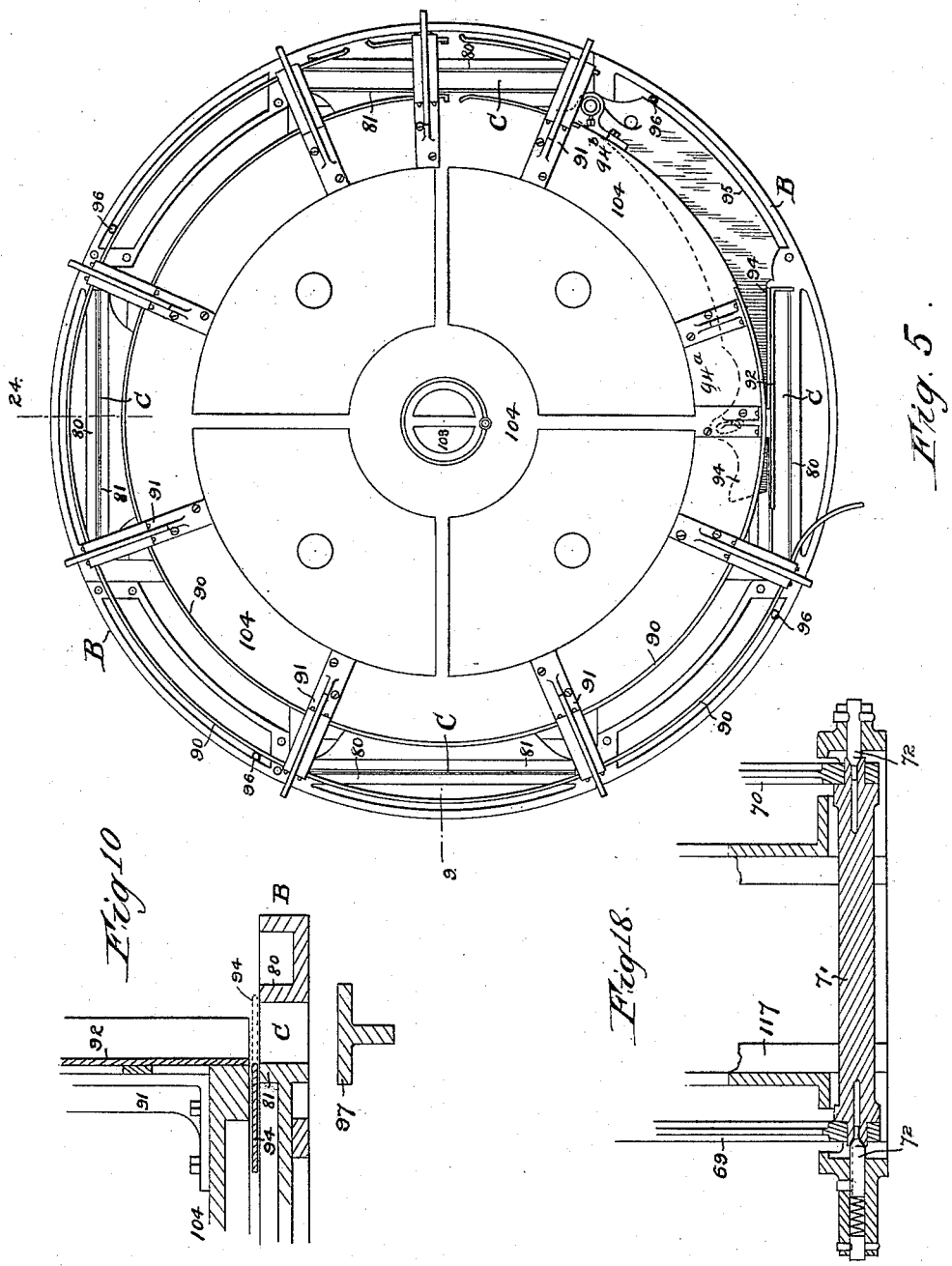
Figure 6:
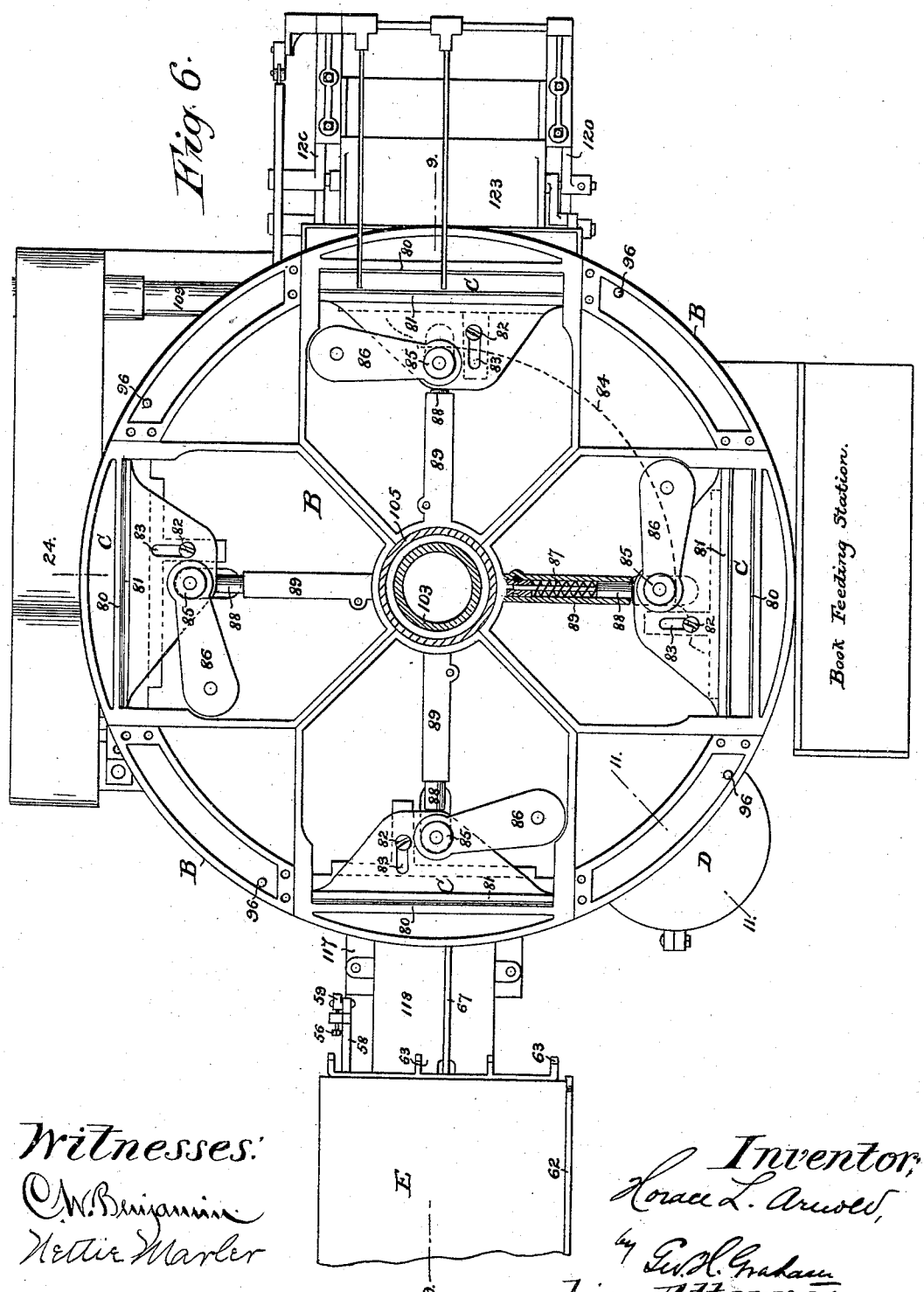
Figure 7:
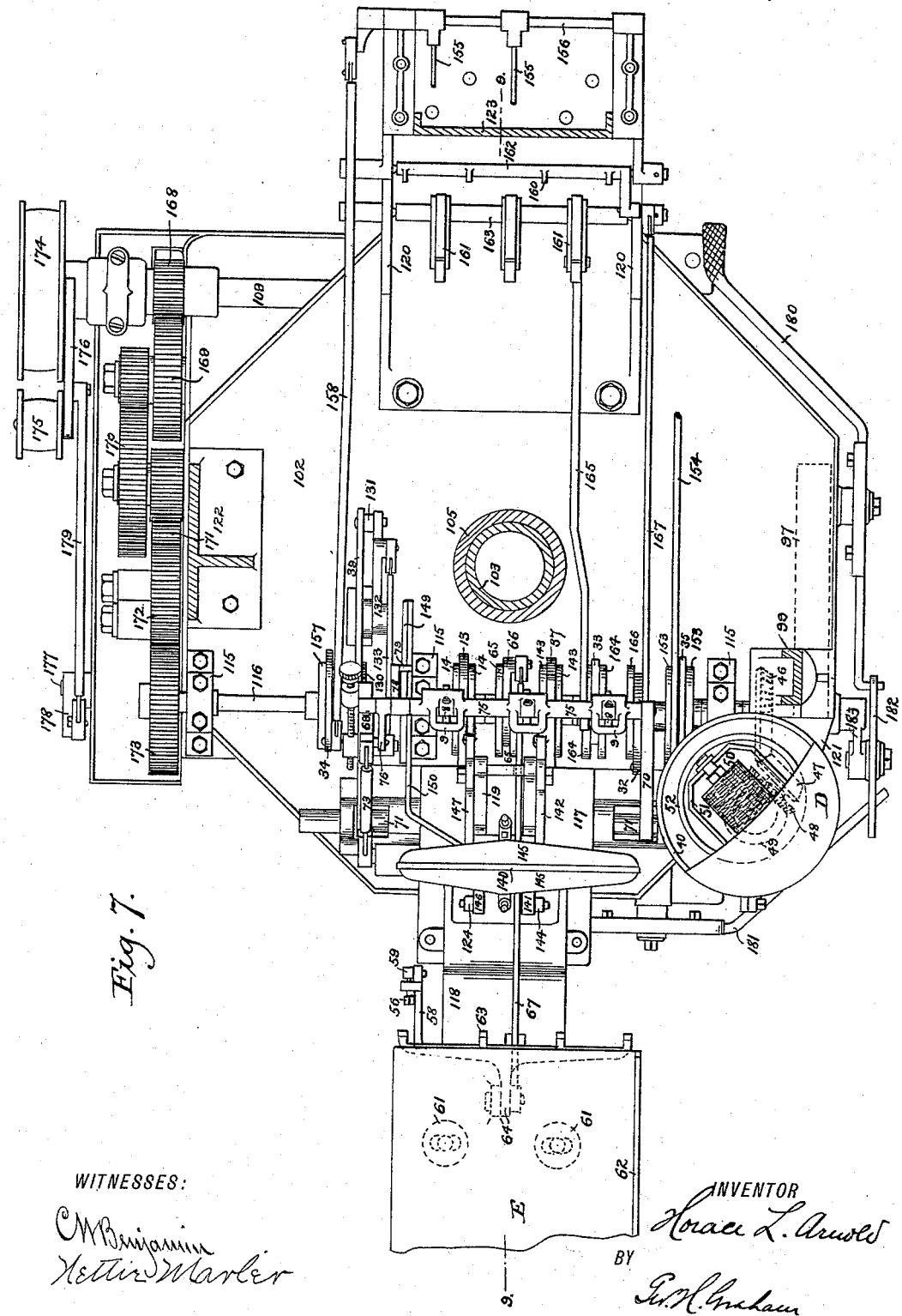
Figure 8:
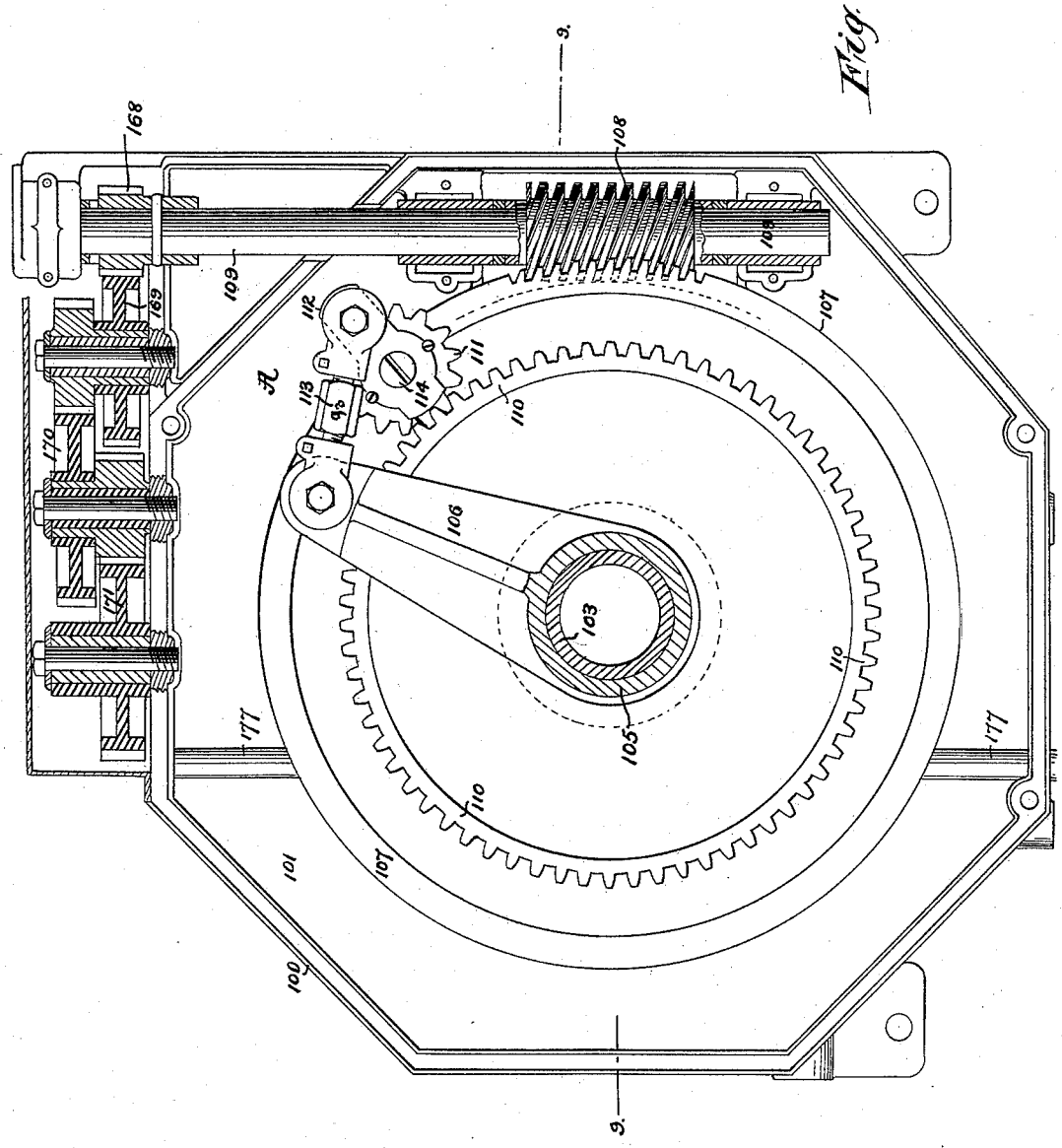
Figure 9:
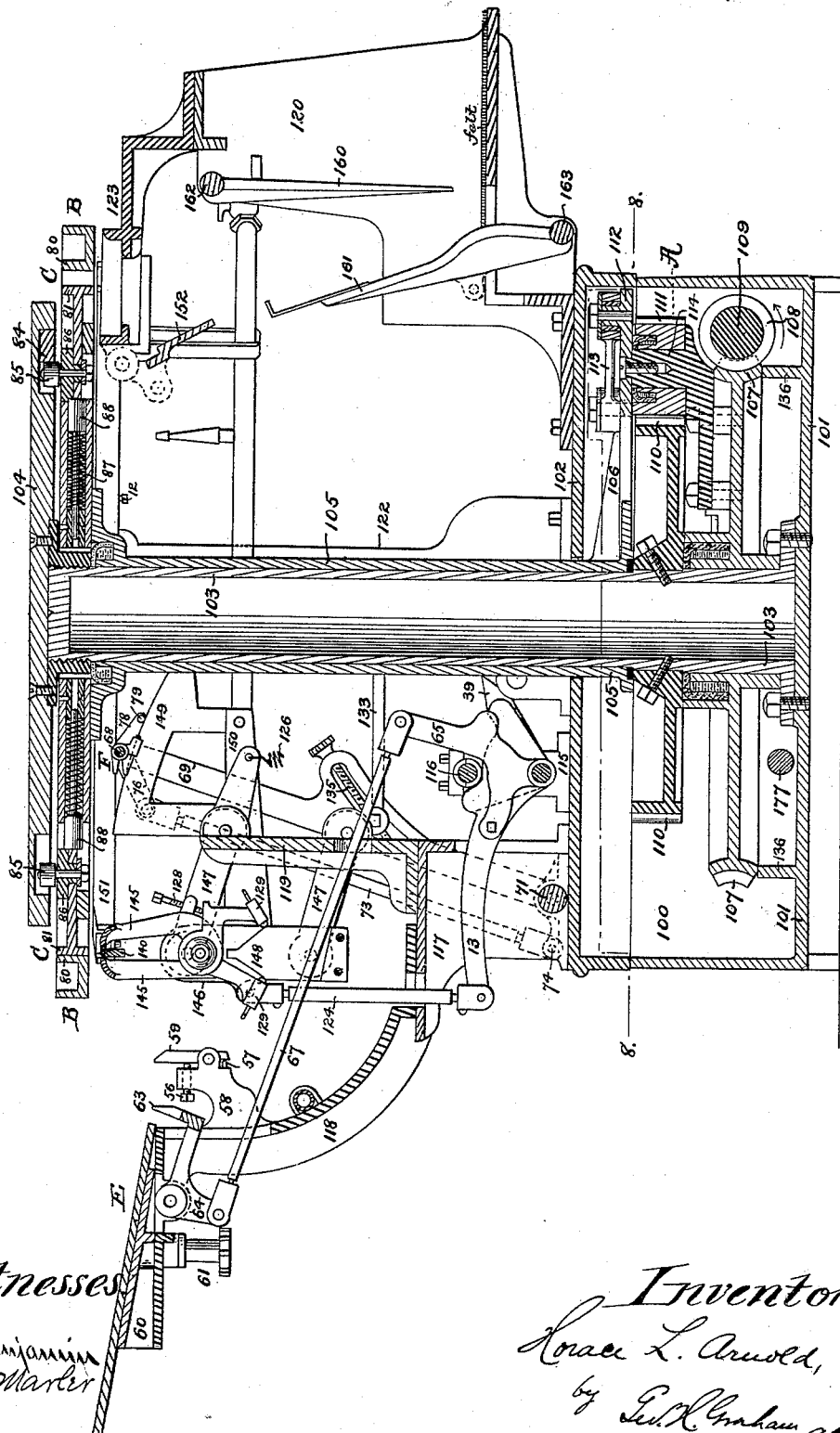
Figure 11:
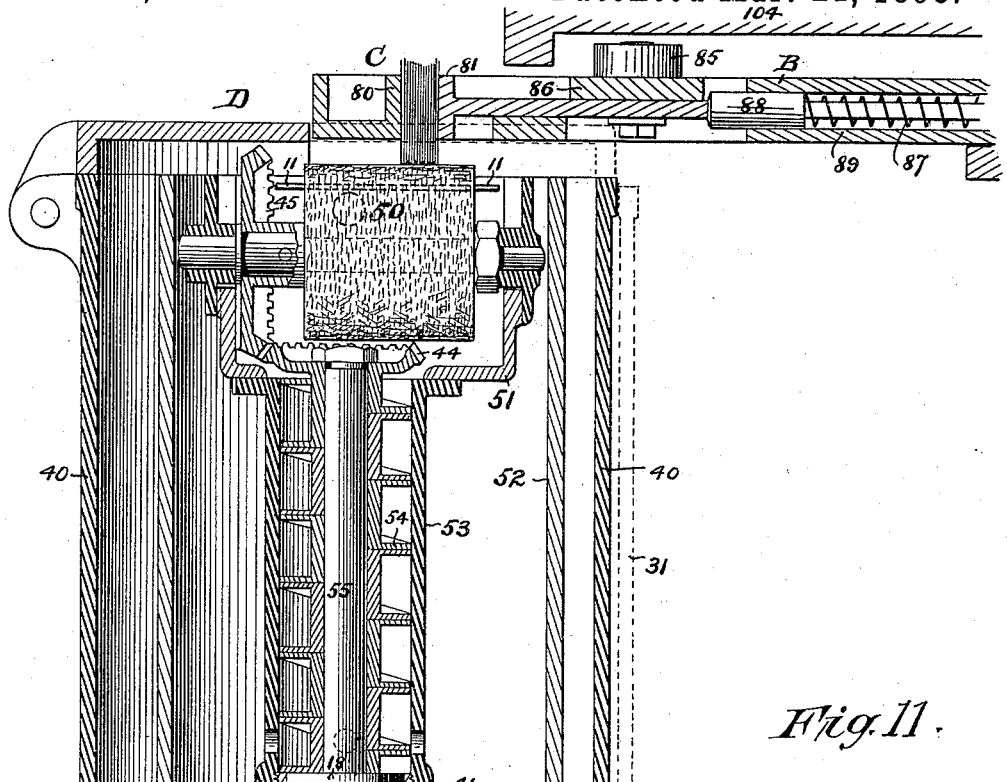
Figure 12:
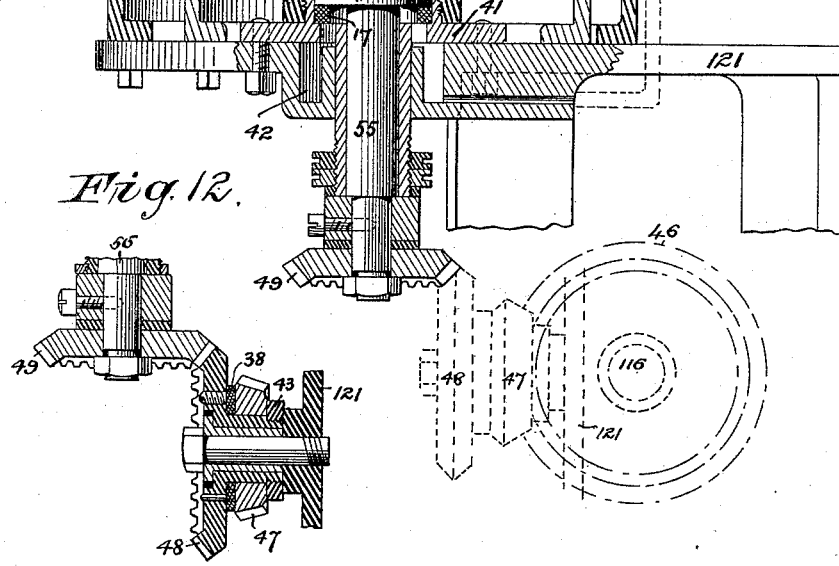

Figure 1, is a complete front elevation of the machine. Fig. 2, is also a front elevation of the machine, the supporting gage, the cementing device and the stand being removed, the cover feed table and its stand being in central section, and the parts being in a different position from that shown in Fig. 1. Fig. 3, is a side elevation looking from the opposite side of the machine shown in Figs. 1 and 2, the smoothing device stand and a portion of the smoothing device being broken away, and the transmitting gears between the driving shaft and the cam shaft being also removed but indicated by dotted lines. Fig. 4, is a left hand elevation of the machine, the cover feed table and its stand being removed for perspicuity's sake, and the guide way supported by brackets from the fixed table being also omitted for the same purpose; the parts being in the position shown in Fig. 2. Fig. 5, is a top or plan view of the fixed table and carrier; the parts below the carrier being omitted. Fig. 6, is a plan view of the machine, the fixed table being removed to expose the surface of the book carrier and the grasping devices therein, the parts being shown in the dwell position of the carrier, as in Figs. 1, 3 and 8. Fig. 7, is a similar view, the table and carrier being removed. Fig. 8, is a horizontal section taken on line 8, 8, of Figs. 1, 2, 3, 4 and 9. Fig. 9, is a central vertical section taken on line 9, 9, of Figs. 5, 6, 7 and 8, the guide way and its brackets and the knocker being omitted for the sake of perspicuity. Fig. 10, is a sectional elevation taken on the line 10, 10 of Fig. 1. Fig. 11, is a central vertical section taken through the cementing device on the irregular line 11, 11, of Figs. 4 and 6 also showing a portion of the book carrier with a book in contact with the applying brush. Fig. 12, is a vertical section of a portion of the gearing for transmitting motion to the applying brush of the cementing device. Fig. 13, is an enlarged sectional elevation of one of the gripper arms and the operating connections. Fig. 14, is a front elevation of the gripper sleeve and immediate connections. Fig. 15, is a plan view of the same. Fig. 16 is a sectional elevation taken on the line 16, 16, of Figs. 14 and 15. Fig. 17, is a sectional elevation on the line 17, 17, of Fig. 13. Fig. 18, is a sectional elevation of the gripper arms and rock shaft. Fig. 19, is an elevation looking from the front of the machine of the presser and breaker and their immediate connections, the parts being shown in their down position; a portion of the book carrier, a book and the cover being also indicated above the presser and breaker. Fig. 20, is a sectional elevation of the presser and breaker and the immediate connections of the breaker, taken on the line 19, 19, of Fig. 21, the parts being shown in their high position; a portion of the book carrier and a book and a cover being shown in position at the time the breaker operates. Fig. 21, is an elevation of the presser and breaker and their immediate connections, looking from the left hand side of the machine, the parts being shown in their down position. Fig. 22, is a horizontal section taken on the line 22, 22, of Figs. 19 and 21. Fig. 23, is a similar section taken on the line 23, 23, of Figs. 20 and 21. Fig. 24, is an enlarged sectional elevation taken on the line 24, of Figs. 3, 5 and 6.

The various instrumentalities forming the pamphlet covering machine are supported by a framework consisting of a hollow bed 100, formed by an octagonal base plate 101, and a covering or top-plate 102—within which bed the carrier driver A is located, Figs. 8 and 9. It also consists of a centrally arranged hollow and stationary pillar 103 that is secured to the base plate and raises vertically from within the hollow bed to and rigidly supporting at its upper end a fixed table 104. The hollow pillar 103 forms a support and guide for a revoluble sleeve 105 which carries at its upper end, immediately below the fixed table, the book-carrier B, and at its lower end within the hollow bed is provided a radial arm 106 for connection with the driver. The top plate 102 of the hollow bed supports a set of bearings 115 for the cam shaft 116, and for the fork shaft which supports the cam forks. It also supports at the left hand of the machine a rocker stand 117 to the top of which is secured the cover feed-table stand 118 and the presser and breaker stand 119. At the extreme opposite or right hand side of the machine it supports a delivery stand 120 to the top of which stand is secured the delivery plate bracket 123. Slightly to the left of the book feeding station the top plate also supports a cementing device stand 121, and diametrically opposite the station or at the rear of the machine it supports the smoothing or drying device stand 122.

The carrier-driver A consists of a worm wheel 107 that rotates loosely on a vertical bearing formed by the base of the pillar 103 and to which wheel motion is imparted by a worm 108 rigidly secured to a driving shaft 109, that is supported in suitable bearings in the hollow bed. Above the worm wheel is mounted a stationary spur gear 110 that is fixedly connected with the pillar 103 and the teeth of which are engaged by a planet pinion 111, that rotates about a stud 114 carried and projecting from the upper face of the worm wheel. The planet pinion 111, carries a crank 112 the wrist of which is connected by a link 113 to a wrist projecting from the upper face of the radial arm 106 of the sleeve. The link may be adjusted in length by turning a double ended screw 93, thus rendering it possible to regulate to a nicety the position of the carrier grasping devices with respect to a given point, at the points of dwell. From this construction and arrangement of the driver it will be seen that in the rotation of the worm wheel, which is a continuous one, the planet pinion carried thereby will be revolved about its stud by engagement with the stationary spur gear; that in such movement of the planet pinion the radial arm and its sleeve will be intermittently moved, their periods of dwell occurring at the time the crank wrist crosses the pitch lines of the spur gear, and in consequence of the location of the crank wrist outside of the pitch line of the pinion, at the termination of the dwell the sleeve and radial arm will have a slight retrograde motion imparted to them before commencing their forward travel. In coming to a complete stop the motion of the sleeve and arm will be gradually accelerated, so that no jar to the book carrier will be incident to its stopping and starting. The spur wheel has four times as many teeth as the planet pinion so that the latter will make exactly four complete revolutions upon its stud to one revolution of the worm wheel; consequently the radial arm, the sleeve and the book carrier will have four periods of dwell in making one revolution, and of course in the continuous operation of the driver these periods of dwell will always occur at the same point in the travel of the book carrier, all as fully set forth in my said patent No. 377,133. To prevent the worm wheel 107 from tipping from the tendency of the planet pinion and wheel 110 to separate there is provided a rib 136 that extends from the base plate up to the underside of the worm wheel and concentric with its axis and against the upper face of which the worm wheel revolves.

Suitable provision for oiling and keeping the parts properly lubricated is provided so that there will be no danger of their running dry. Thus the hub of the worm wheel has a recess concentric with the axis thereof, of sufficient depth to contain a body of oil and a lubricating wick that bears against the journal of the wheel to constantly lubricate it. A similar arrangement is provided for lubricating the stud upon which the planet pinion revolves as clearly seen in Fig. 9.

The book carrier B, may be of any form adapted to carry and support a book to be covered, but in the preferred construction it consists of a number of independent sections bolted together to form exteriorly a flat circular structure said independent sections being in turn securely bolted to a horizontal flange projecting from the upper end of the revoluble sleeve 105.

The book carrier Figs. 5 and 6, is provided with a plurality of automatic book grasping devices C, as many as there are periods of dwell in a revolution of the carrier,—in the present instance four—although there might be only two, or only one, in which latter case the periods of dwell of the carrier would correspond therewith, but not necessarily. These grasping devices are arranged in the carrier at equal distances apart, the grasping faces being at right angles to radial lines drawn from the axis of the carrier through the center of the devices, and are adapted to hold books of varying thicknesses without adjustment. The grasping devices each consist of a vise formed by a fixed front jaw 80 near the circumference of the carrier and a movable jaw 81 adapted to slide to and from the fixed jaw in bearings in the carrier. The length and extreme width of the opening formed by the jaws will be a little in excess of the extreme length and thickness of the pamphlet or book to be grasped thereby. The sliding jaw is held to its seat by the head of a pin 82 the shank of which passes through a slotted opening 83 in the sliding jaw and the required movement of the sliding jaw from the stationary one is imparted by a stationary cam 84 secured to the underside of the fixed table 104, Figs. 6 and 9, that bears upon suitable rolls 85 projecting from the face of levers 86. Each lever 86 is pivoted at one end to the carrier and at the other end is pivotally connected to the movable jaw on the radial line before referred to. This opening movement of each of the jaws is had against the force of a spring 87 bearing a horizontal plunger 88 against the rear of the jaw; the bolt and spring being confined within a recess 89 formed in the carrier. The cam 84 is so positioned with respect to the travel of the carrier and its grasping devices that it will hold two contiguous devices open; first, at the book feeding station to permit the feeding of the book or pamphlet into one of the grasping devices, and second, at the delivery station to deliver the covered book from the other grasping device so as to pass to the delivery devices. Said cam is of a shape that it will permit the movable jaw of the grasping device to which the book has been fed, to close upon and grasp said book shortly after the carrier commences to move from its dwell position; and to cause the movable jaw of the grasping device grasping the covered book to move to release said book before the carrier reaches its point of dwell, and to hold that device open against the action of the spring until it reaches the book feeding station. The other two grasping devices being free of the cam each of their movable jaws is under the control of its respective springs, tending to close them. The fixed table 104 is also of circular form and of less diameter than that of the book carrier B, so that the grasping devices of the latter will extend beyond the edge of the table to permit the book or books grasped thereby to travel unobstructedly.

In order to support the leaves of the book which extend upward from the carrier in its travel, there is provided a guideway formed by a number of horizontally arranged strips 90 supported upon opposite sides of the path of the book-leaves by inverted U shaped brackets 91 that rise from and are secured to the table 104. This guide way extends from a point adjacent to the book feeding station at the front of the machine, around to the left, past the cover feeding station to its rear and to its right hand side where it terminates at the delivery station. The inner strips of the guide way at the book feeding station terminate in a vertical gage plate 92 with an end flange that forms a guide to sustain the book in proper register with the grasping device into which the book is to be fed.

In connection with the gage plate 92 at the book feeding station there is employed a temporary book holder 94 Figs. 5 and 10, that normally overlies the surface of the carrier so as to hold the book ready to drop or be fed into the grasping device when the carrier comes to its dwell position, and is adapted to move to one side to permit the book to drop into the grasping device. This holder consists of a plate pivoted at its right hand end to a bracket secured to the side of the fixed table 104, the opposite or free end being guided and steadied by a pin 94$^a$ projecting from the under side of the table into a curved slot in the plate. The plate is held in its outward position to hold the book, by a spring 94$^b$ coiled about its pivot, and a portion of its outer face forms a cam 95 against which bears a pin 96 projecting from the upper face of the book carrier B. There are as many pins 96 as there are grasping devices and they are so positioned with respect thereto and to the cam of the holder plate that when the carrier comes to its dwell position the pin will have borne against the holder plate cam and rocked the plate inwardly below the table so that the book falls into the grasping device the instant the carrier comes to rest. The holder plate cam is of such length that when the carrier moves again the pin 96 will hold the plate inward long enough to allow the book then in the control of the carrier to pass beyond its free end, when the plate will return to its normal outward position ready to hold the next book placed in feeding position, and be again operated in like manner by the next succeeding pin. At this station there is also provided a supporting gage 97, Figs. 1, 7 and 10, with its bearing face a short distance below the underside of the book carrier B and upon which the back of the book rests between the jaws of the grasping device. This supporting gage is secured to the upper face of a bracket 98 that is in turn adjustably secured to an arm 99 rising from and fastened to a portion of the cementing device stand 121. The adjustment between the bracket and arm is a vertical one, and is had by a vertical screw 10 that is threaded into the lower end of the bracket with its head bearing against a shelf extending from the side of the arm. A pair of securing bolts is held in the arm and each extends through vertical slots in the bracket, and by which the position of the latter is fixed. By raising or lowering the bracket and its supporting gage the distance the back of the book may extend below the underside of the carrier is regulated and determined. The supporting gage extends for a distance in the direction traveled by the book while under the control of the carrier so that after the book has been fed into the carrier, between the open grasping jaws, the carrier may commence its forward travel to allow the rear wall of the jaw to meet the head of the book and push the back of the latter over the surface of the gage for a short distance, whereupon the movable jaw will pass from the control of the cam 84 and immediately move to grasp the book under the influence of its spring plunger, carrying the book along positively, with its back unobstructed, over and in contact with the cementing device D. The cementing device is mounted upon the stand 121 and consists of a revolving glue or paste applying brush 50, Figs. 7 and 11, that rotates in a receptacle 51 arranged within the open mouth of a reservoir 52. From the bottom of the receptacle 51 there extends a feed tube 53 to the bottom of the reservoir. Within the feed tube there is mounted an elevating feed screw 54 fitting closely against the inner wall of the tube and forming a part of or secured to a vertical shaft 55 that extends below the end of the feed tube through an opening in the stand 121 and at its end carries a beveled wheel 49 in gear through intermediates 47, 48, with a beveled wheel 46 secured to the front end of the cam shaft 116, and from which motion is imparted to the vertical shaft and feed screw.

The glue applying brush 50 is secured to a shaft that rotates in bearings provided in the receptacle 51 and has secured to it a beveled wheel 45 that meshes with a like wheel 44 carried at the end of the vertical shaft 55, from which the brush derives its motion. When glue is the adhesive material used, the reservoir will be provided with a hot water jacket 40 to keep the material in a proper liquid condition. The hot water jacket and reservoir are in the form of open ended cylinders having a flange at one end to rest upon and be secured to the upper face of the stand 121 which thus forms the bottom thereof. The feed tube 53 is threaded to the end of a flanged hub 41 that forms a bearing for the vertical shaft 55 and through its flange is also secured to the upper face of the stand 121, its hub portion extending down through an opening therein.

In the operation of the cementing device the feed screw shaft will feed the liquid material from the bottom of the reservoir 52 through the feed tube into the brush receptacle 51. The feed will be sufficient to keep the latter receptacle filled to overflowing, the overflowing material passing over the sides of the receptacle into the reservoir to be fed over again. At one side of the revolving brush there is a scraper 11 which takes the surplus material from the brush before it applies its coating to the back of the book. The face of the brush will be wide enough to apply a coating of material to the entire face of the book-back, and the scraper 11 may be adjusted to clean the operative face of the brush more or less at either end so that the material may be applied to any part of the book back and in such quantities as is desirable. The feed screw shaft 55 is formed with a flat disk 18, immediately below the screw, which rests upon a ledge of the flanged hub and formed preferably by a washer 17 of vulcanized fiber instead of metal. The upper face of the stand 121 is formed with an oil chamber 42 immediately surrounding the hub 41, and the connecting web between said hub and its flange has openings for the passage of oil to the under side of the disk and washer and over the end of the hub to the shaft. The lubricant is supplied to the chamber under a head pressure by a stand pipe 31 of about the height of the reservoir 52, (see dotted lines Fig. 11) and connecting with said chamber so that the pressure of the lubricant in the chamber may exceed that of the liquid material in the reservoir to counteract its tendency to leak past the washer 17. The disk 18 of the screw shaft will of course be held to its seat upon the ledge or washer 17 both by the weight of the material being fed thereby, and by the back pressure upon the feed screw in its revolution, so that ordinarily there will be no leakage.

In order to prevent any unnecessary strain upon the parts, should the cementing device become clogged up, as for instance by the hardening of the adhesive material upon the removal of the heat, one of the gear wheels by which motion is transmitted to the screw shaft, is connected frictionally with its shaft so that it will slip if the feeding device should not operate readily. Thus the intermediate wheel 47, Fig. 12, in gear with the bevel wheel 46 on the cam shaft is mounted upon the hub of the intermediate wheel 48 between a collar 43 threaded onto the end of the hub and a friction washer 38 held to the back of the wheel 48, which washer may be set up to bear with greater or less friction against the wheel 47 by set screws passing through the wheel 48.

The cover feed table E extends to the left of the machine at right angles to the book feeding station or to the point at which the book is fed to the carrier D, and in front of the cover feeding station of the latter. It is supported upon a base 60 that is secured so that it and the table may be adjusted laterally upon the top face of the feed table stand 118. This adjustment is had by means of a pair of hand nuts 61 engaging with threaded bolts which extend from the feed table base down through slotted openings in the top of the feed table stand. The purpose of this adjustment is to move the cover-head gage, or the feed table and head gage, to enable the head of the cover to be located accurately with respect to the head of the book, whether the cover-head is to accurately register with the book-head or is to lap on either side of the book-head. One side of the feed table has a fixed head-gage 62, and at the forward end there is a series of gage fingers 63 projecting from the upper edge of a cross bar provided at the end of the long arm of a bell crank 64 that is pivoted to the feed-table stand so that the gage fingers may be rocked from their position shown in Fig. 2, away from the edge of the cover—which has been fed against them—downward below the end of the feed table, as in Fig. 1, to be out of the way of the movement of the cover as it is lifted and carried inward by the feeding device hereinafter described.

Suitable and timely motion is imparted to the gage finger lever by means of a pair of cams 65, Figs. 4 and 7, that are mounted on the cam shaft 116 through a cam fork 66 the rolls of which bear against their respective cams of the pair and a connecting rod 67, one end of which is connected to the cam fork and the other to the short arm of the gage finger lever.

The traveling cover feeder or feeding device F consists of a number of grippers formed by movable and fixed jaws 8, 9, that are mounted upon a horizontal rock shaft 68 held at the upper ends of a pair of pivoted and vibrating arms 69, 70, the lower ends of which arms pass upon opposite sides of the rocker stand 117 and are connected to a rock shaft 71 that is pivotally mounted between the ends of a pair of centers 72, Fig. 18. Each of these centers is within a hub projecting from the base flange of the rocker stand 117, one of them is fixedly secured to its hub while the other is splined and held to duty by a spring interposed between its end and an abutment in the end of the hub. By this mounting of the gripper arms all lost motion occasioned by the wear of the bearings is immediately taken up automatically. The opposite ends of the rock shaft 71 are each provided with a deep recess into which the centers partially extend that forms a chamber for a body of oil to lubricate them.

The gripper arms are adapted to vibrate on the centers 72 from their inward position shown in Figs. 3, 7 and 9 under the book carrier B, toward the forward edge of the feed table E, as in Fig. 2, and back again. This motion of the gripper arms is imparted by a pair of cams 130 Figs. 4, 7 and 13, that are mounted on the cam shaft 116 through a cam fork 39, the rolls of which bear against their respective cams of the pair, a link 131 connecting the cam fork with the short arm of the bell crank 132, that is pivoted to a bracket secured to the top plate of the machine bed, the long arm of which lever is connected to one end of a radius rod 133, the opposite end of which is connected to the gripper arm 69.

The limit of the outward motion or travel of the gripper arms to take a cover from the feed table is a fixed one; and in order to adapt the cover feeding devices to present any sized cover in proper position to the back of the book to be covered, it is necessary that the inward or carrying movement of the gripper arms shall vary as the size of the cover employed varies. To this end the connection between the end of the radius rod and the gripper arm 69 is adjusted to cause the lever arms to be vibrated inwardly to a greater or less extent. Thus the gripper arm 69 is provided with a curved slot 134 in which is mounted an adjustable stud, to one end of which the end of the radius rod is connected. The opposite end of the stud is threaded to receive an adjusting screw 135 that is mounted at its upper end in a stud-bearing pivotally connected to the arm above the curved slot. The adjusting screw 135 has at its upper end a hand wheel by which it may be turned to regulate the position of the radius rod stud in the curved slot, as seen in Figs. 13 and 17. The slot 134 extends at an angle to the radius of the gripper arm so that it is simply necessary to change the position of the end of the radius rod in the slot without varying the length of the rod.

The fixed jaws 9 of the grippers are formed on a gripper sleeve 75 surrounding the rock shaft 68, Figs. 14 to 16. One end of the sleeve is provided with a rigidly connected arm 76 that is pivotally connected to the upper end of a position rod 73, Fig. 13, which extends down forward of the gripper arm 69 and pivoted upon a stud 74 extending from the side of the rocker stand 117. The function of this position rod is to hold the grippers in a certain determined position with respect to the arc of vibration of the gripper arms, and at the same time to hold the gripper sleeve and its jaws in a fixed position with respect to the rock shaft 68 and its jaws so that at the time said rock shaft is rocked to open the grippers, the other jaws will be held stationary.

The gripper sleeve is spaced and the jaws 9 are in the form of a bridge spanning the space between the adjacent ends of the sleeve. The movable jaws 8 are provided with a hub which surrounds the rock shaft 68 in the space between the adjacent ends of the gripper sleeve and to which shaft they are secured by set screws so as to move therewith. There is a slight movement between the jaws 8 and the rock shaft to accommodate any slight inaccuracy in the face of the fixed jaws so that each set of the jaws will independently grip the covers. The gripper sleeve carries spring seated plungers 77 each adapted to bear against a shoulder projecting from the rear of the movable jaw 8 the tendency of which is to hold the grippers to their closed or gripping position. The rock shaft 68 is provided with an opening arm 78, in a space between the end of the sleeve and the arm 76, that extends rearward and carries at its end a stud 79. The normal position of the grippers is closed so that the rock shaft carrying the jaws 8 must be rocked at the forward position of the gripper arms to open the jaws to receive the edge of the cover between them and then be released to grip it; and at the inward position of the gripper arms beneath the book-carrier the rock shaft must be again rocked to open the gripper jaws to release the cover. At the limit of the outward movement of the gripper arms the opening stud 79 moves against the inclined end of a tripper 59, that is mounted at the end of a bracket 58 projecting from one side of the feed table stand 118. The tripper 59 is pivotally mounted to the bracket and at its lower end is provided with a shoulder that is borne against by a spring plunger 57 carried by the bracket and is adjusted by a temper screw 56 to leave the opening stud accurately at the end of the outward movement of the grippers. The tripper is also thus held rigid during the outward movement of the grippers for contact with the opening stud, but on the return movement thereof will be rocked downward to allow the opening stud to pass without being operated. The gripper arms are vibrated outward toward the cover feed table at about the time the carrier grasping device at the book feeding station has grasped a book, and while the back of that book is passing in contact with the glue applying brush 50 the grippers will have gripped a cover and their arms be moving in the opposite direction inwardly to carry the cover into its covering position with its center in line with the back of the book. Before this book reaches the covering station and the carrier comes to its dwell position the inward movement of the gripper arms will have ceased with the cover in position ready to be pressed to the book back, when the carrier and book come to rest. The presser consists of a bar 140, Figs. 19 to 21, of a length exceeding the length of the longest book to be covered that is mounted at the upper end of a carrier 141 secured to the outer ends of a pair of links 142, the opposite ends of which are pivotally connected to one side of the presser and breaker stand 119. One of the links the upper one is extended and connected to a spring 127 by which the carrier is counterbalanced. The carrier is a vertically arranged plate the upper end of which provides a seat for the presser bar 140 to which the bar is removably secured. There will be a number of presser bars provided of different widths corresponding to the different thicknesses of the books to be covered so that a presser bar of the proper width may be secured in place. The movement of the presser bar carrier is such that immediately after the grippers start inward with a cover it will begin to rise and meeting the cover will help to sustain it and upon the book-carrier and book coming to rest at the cover feeding station the cover being then in proper position below the book-back, the presser bar continuing its upward motion will carry the middle of the cover upward in contact with the book back and still moving will press the cover firmly onto the book back and at the same time move the book bodily between the jaws of the grasping device until the presser reaches the limit of its upward motion at which point it dwells. During this dwell of the presser bar the book carrier will make its slight retrograde motion and thereupon move forward again, drawing the back of the book with its adhering cover over the face of the presser bar once in opposite directions, whereby a smoothing of the cover upon the book back is effected. The presser carrier and its bar will then commence to return downward to its normal position. The presser bar may be heated by a flame from a burner 30. Suitable and timely action will be imparted to the presser bar carrier by means of a pair of cams 143 that are mounted upon the cam shaft 116, through a cam fork 37 the rolls of which bear against their respective cams of the pair, to a connecting rod 144 one end of which is connected to the cam fork and the other end to the presser bar carrier. Immediately after the presser presses the cover to the book-back and before the book-carrier commences its retrograde motion the breaker 145 will operate to break or crease the cover over the corners of the book back as the cover is being pressed firmly against the back. The breaker consists of a pair of jaws pivotally mounted on the inside of a breaker carrier 146 supported at the outer ends of a pair of links 147 that are pivoted at their opposite ends to the presser and breaker stand 119; the said breaker carrier being in line with the presser carrier 141 so that the breaker jaws may extend one upon each side of the vertical faces of the presser bar 140. The carrier is counterbalanced by a spring 126 in the same manner as the presser carrier. Below the pivot their jaws are formed with downwardly extending fingers carrying spring pressed plungers 129 that bear against the faces of a double faced wedge 148 that is secured to the lower end of the presser carrier 141; the effect of which is to force the breaker jaws first against the vertical sides of the presser bar under spring pressure, and when the jaws move up to break the cover over the corners of the book-back to hold said jaws so that they will move in squeezing contact with the book and its cover. One of the breaker jaws 145 is formed in two parts, the finger carrying the spring pressed plunger 129 being independent of the jaw portion, but mounted upon the same pivot as the jaws see Fig. 23. The position of this jaw with respect to its spring plunger finger is adjusted by means of a set screw 128 that bears upon a shelf extending from the finger, and through which set screw the action of the wedge 148 is communicated to the jaw proper, the weight of the latter keeping the set screw against the shelf of the finger. By this construction this jaw may be adjusted with respect to the other jaw and to the presser bar so as to accommodate itself to the varying sizes of the presser bars. Suitable and timely motion is imparted to the breaker carrier and the jaws by means of a pair of cams 14 Figs. 4 and 7, that are mounted upon the cam shaft 116, through a cam fork 13 the rolls of which bear against their respective cam of the pair to a connecting rod 124 one end of which is connected to the cam fork and the other end to the breaker carrier. The breaker carrier with its jaws moves up simultaneously with the presser carrier but with a little acceleration in its movement so that at the time the presser presses the cover upon the book back, the breaker jaws will be flush with the top surface of the presser bar and while that bar dwells against the cover and book-back the breaker jaws continue to move upwardly until a short distance beyond the top surface of the presser bar, Fig. 20. In doing so the jaws will extend upon opposite sides of the book and bear against the flaps of the cover to properly break the same over the corners of the book-back, when they will dwell in that high position. The presser bar and its carrier upon the completion of the retrograde motion of the book carrier will quickly descend so that the wedge 148 in moving down between the spring plungers of the breaker jaws will free them and permit said jaws to rock on their pivots by gravity some distance away from the book, but in position to hold the two flaps of the cover a litttle upward from the book back so that their weight will not tend to overcome the adhesion of the cement before it has become sufficiently dry to secure the cover in place. The outer ends of the spring plungers 129 have pins which limit their movement, so that when the wedge moves down their springs will have no influence on the breaker jaws. The breaker jaws remain up in their open position supporting the cover while the book carrier starts and carries the book and adhering cover onto the smoothing or drying device.

Immediately prior to the breaking action of the breaker jaws the grippers of the cover feeder will have been rocked to release the end of the cover and permit the jaws to act without tearing it. This opening movement of the gripper jaws is effected by a wing 149, Figs. 3, 7 and 9, in position to move against the opening stud 79 and rock the gripper rock shaft. The wing 149 projects from the upper side of an arm 150 that is secured to and projects inwardly from the outside of the breaker carrier 146, so that the wing is moved to bear against the opening stud of the grippers simultaneously with the pressing of the cover and book-back by the presser bar. The operative face of the wing is of sufficient length that it will operate the gripper opening stud in whatever position the gripper arms have been adjusted to vibrate inwardly.

In the operation of the presser bar the back of the book and its adhering cover will be left projecting from the under side of the carrier in proper height to bear against the upper face surface of the smoothing or drying device 151. The effect of this action of the presser bar is such that the book may be carried by the carrier with its back projecting sufficiently below the underside of the carrier to move in contact with the revolving brush of the cementing device so that no matter to what extent the back of the book may thus project to be properly coated with adhesive material the presser bar in its action of pressing the cover to the book back will always leave the book back with its adhering cover in proper position to bear against and travel over the surface of this smoothing and drying device.
The smoothing or drying device 151 consists of a flat plate 125 curved to correspond with the travel of the book back while under the control of the book carrier. It is mounted in a trough curved to correspond with the smoothing plate that is in turn supported by the stand 122 to which it is secured and by the rear side of the delivery bracket 123 to which it is also secured. The smoothing plate is adjustably mounted in the trough by means of proper set screws 12, Fig. 24, so that its distance below the under surface of the book carrier may be regulated. The trough carries U shaped brackets adapted to sustain a gas pipe having burners arranged below the under surface of the trough and by which the smoothing plate may be heated if desired to completely dry the cover upon the book-back as they pass in contact therewith. The smoothing plate and trough extend from a point slightly beyond the cover feeding station to a point slightly removed from the delivery station and the book with its adhering cover moves in contact with the plate in the further movement of the carrier until just before it arrives at the delivery station so that in one of the periods of dwell of the book carrier the covered book will come to rest thereon and at the same time be subjected to a rubbing action on the plate in the retrograde motion of the carrier.

At the delivery station of the book carrier there is provided a temporary receiving plate 152 Figs. 1 and 9, that controls an opening in the delivery bracket 123. This bracket extends from the top of the delivery trough stand under the book carrier B, with its opening beneath the opening of the grasping device when the carrier comes to rest so that the receiving plate is in position to receive the covered book as soon as the grasping device releases its hold thereon. The receiving plate is pivoted to the inner side of the delivery bracket 123 so as to rock downward and inwardly to deliver the book into the delivery trough; and it is preferably situated a short distance below the back of the book and its cover, so that the latter does not bear against it as the carrier moves the book from the smoothing plate. As the book carrier moves to its delivery station the roll 85 will be brought in contact with the end of the stationary cam 84 so as to move the movable jaw of the grasping device positively inward toward the center of the carrier and thus free the book so that it may be delivered therefrom. The operation of the receiving plate 152 is such that at the time the covered book is in condition to be delivered the plate will be in position to temporarily hold the book from being delivered entirely from the carrier. The effect of this is that as the opening of the grasping device will necessarily commence and terminate before the carrier comes to rest, and will occur sooner or later according as the thickness of the book varies and before the book is fairly in position to be properly delivered, the receiving plate over which the book will be pushed will temporarily hold the book from falling from the carrier until the carrier does come to rest. This early releasing movement of the grasping device, and the distance the book has to drop from the carrier to the receiving plate allows thin books, such as pamphlets of a few sheets in thickness which are necessarily more or less acted upon by the air currents produced by the motion of the machine, to commence to drop from the carrier earlier than books whose weight will counteract the tendency of the air currents to delay their movement. Immediately the carrier comes to its dwell position a pair of receiving plate cams 153, Figs. 4 and 7, will through a cam fork 35 having rolls bearing against their respective cams of the pair and a connecting rod 154 one end connected to the cam fork and the other end connected to a short arm projecting from the receiving plate, rock said plate downwardly and inwardly so that the book will pass through the opening in the delivery bracket and fall back downward into the delivery trough. In the act of passing through the opening in the delivery bracket the flaps of the cover which have heretofore been projecting at right angles to the book-body will be folded up against the sides of the book. After the passage of the book through the delivery bracket opening, the cams 153 will rock the receiving plate back to its normal position ready to receive the next book from the carrier.

In order to insure the movement of the book entirely from the control of the book carrier there is provided a pair of knocker arms 155 that are mounted upon a rock shaft 156 supported in a pair of brackets extending upward from the top of the delivery trough stand 120. The free ends of these knocker arms are adapted to move down toward the book carrier, and should the movement of the book be delayed from any cause will strike the upper edge of its body and move it down positively from the carrier. Timely motion is imparted to the knocker arms by a pair of cams 157 Figs. 4 and 7, mounted on the cam shaft through a cam fork 34 the rolls of which bear against their respective cams of the pair and a connecting rod 158 connected at one end to the cam fork and at the opposite end to an arm fastened to the rock shaft 156.

The delivery trough is formed by the base and vertical sides of the delivery trough stand 120 which however, may be extended outward from the machine to any desired length so as to carry the accumulation of covered books by a second trough 159 supported in any suitable manner by the delivery trough stand. Between the walls of the delivery trough stand there are mounted a pair of fly frames, one a holding fly frame 160 projecting from a rock shaft downwardly, and the other a carrier fly frame 161 projecting upwardly from a rock shaft. At the time the covered book is delivered from the book carrier the holder fly frame stands in substantially a vertical position while the carrier fly frame stands in an inwardly inclined position sufficient to allow the falling book to clear the ends of fly fingers, and the two fly frames thus form a throat into which the covered book falls until its back rests upon the base of the delivery trough which is lined with felt to prevent injury to the book back. The shape of the carrier fly frame fingers is such that the back of the book is guided outwardly so that the outer side of the book body and the cover flap at that side lie near the lower end of the holder fly frame. As soon as the book has been delivered into this position the carrier fly frame is rocked inwardly, the book still resting thereon, and the holder fly frame is also rocked inwardly so that its finger ends sweep against the cover flap on that side until it passes beyond the top edge of the book lying upon the carrier fly frame, whereupon the carrier fly frame is rocked in the opposite direction to move the book outwardly against the last book previously delivered and the accumulated books moved along in the trough; the holder fly frame is also rocked in the opposite direction outwardly down to its vertical position against the inner flap of the book just carried into position by the carrier fly frame, when the carrier fly frame will be rocked in the opposite direction inwardly and returned to the position first referred to. In this movement of the carrier fly frame the corners of the book back will have been rocked so as to completely and finally break the cover around such corners so that when the covered books are taken from the trough the flaps will lie flat against the sides of the book. The fingers of the holder fly frame extend from and are in one piece with a rock shaft 162 that is mounted between a pair of centers held in hubs projecting from the sides of the upper end of the delivery trough stand 120; and the fingers of the carrier fly frame extend from and form part of the rock shaft 163 that is mounted upon centers held in hubs projecting from the sides of the lower end of the delivery trough stand 120. The construction and arrangement of these rock shafts and their centers are the same as the rock shaft 71 of the gripper arms and its centers, so that no further description thereof is deemed necessary.

Suitable and timely motion is imparted to the carrier fly frame by means of a pair of cams 164 mounted on the cam shaft through a cam fork 33, the rolls of which bear against their respective cams of the pair, and a connecting rod 165, one end of which is connected to the cam fork and its opposite end pivoted to one of the fingers of the fly frame. And like motion is imparted to the holder fly frame 160 by means of a pair of cams 166 mounted on the cam shaft through a cam fork 32, the rolls of which bear against their respective cams of the pair and a connecting rod 167 one end of which is connected to the cam fork and its opposite end to an arm secured to the rock shaft 162. Continuous motion is imparted to the cam shaft 116 from a driving shaft 109, Figs. 3, 4, 7 and 8, by means of a pinion 168 secured to said shaft, and a train of reducing gear 169, 170 and 171, and an intermediate wheel 172, the latter meshing with a gear wheel 173 fast to the end of the cam shaft. The reduction in speed from the driving or worm shaft to the cam shaft is such as to give as many complete revolutions of the cam shaft to each revolution of the worm wheel as there are individual grasping devices in the book carrier. The driving shaft is also provided with a flanged belt pulley 174, around which the slack driving belt passes. There is also provided a belt tightener pulley 175 that is mounted upon a stud projecting from the end of an arm 176 that is hung loosely on a sleeve surrounding the driving shaft. The belt tightening pulley may be moved in position to tighten the driving belt by any suitable means. Thus, a rock shaft 177 is mounted in bearings within the hollow bed on the base plate thereof having at one end at the outside of the bed an arm 178, the outer end of which is connected by a connecting rod 179 to the arm of the belt tightening pulley. The rock shaft 177 may be rocked by connection with one or two treadles 180, 181, one end of each of which may bear against an evener 182, centrally and loosely pivoted to one end of an arm 183 secured to one end of said rock shaft. The construction and operation of the treadles are such that in order to rock the shaft 177, both of the treadles must bear upwardly upon the evener 182, but by relieving the pressure upon either one of the treadles the rock shaft will return to its idle position removing the belt tightening pulley from operative contact with the driving-belt.

From the foregoing description it will be understood that there are eight pairs of cams secured to the cam shaft 116 of the machine, and a stationary cam for operating the grasping devices. The times of these cams and that of the book carrier may be stated to be as follows; taking the position of the cam shaft as zero at the instant the book carrier comes to its dwell position: The book carrier will dwell during the first twenty-five degrees of revolution of the cam shaft, move to the limit of its retrograde motion from twenty-five degrees to seventy degrees, again dwell through twenty-five degrees and from ninety degrees to the end of the three hundred and sixty degrees of revolution, and travel onward to its next point of dwell. The cover gage fingers dwell during the first two hundred and thirty-five degrees rock downward from two hundred and thirty-five degrees to two hundred and fifty degrees, dwell in their lowest position from two hundred and fifty degrees to two hundred and ninety degrees, and rise to their normal position from two hundred and ninety degrees to three hundred and ten degrees in which position they dwell during the remainder of the revolution of the cam shaft. The gripper arms will dwell in their inward position during the first one hundred and fifty-five degrees, move outward from one hundred and fifty-five degrees to two hundred and forty-five degrees, dwell in their outward position five degrees, and from two hundred and fifty degrees to three hundred and fifty degrees return and move back to their inward position where they will dwell the remaining ten degrees of the complete revolution of said cam shaft. The presser bar and its carrier are rising during the first five degrees, dwell in their highest position from five degrees to fifty degrees move downwardly from fifty degrees to eighty degrees, again dwell from eighty degrees to one hundred and sixty-five degrees again move downwardly from one hundred and sixty-five degrees to one hundred and ninety-five degrees and dwell in their lowest position from one hundred and ninety-five degrees to three hundred and fifteen degrees when they again start to move upward and continue such movement during the remainder of the complete revolution of the cam shaft. The breaker jaws and their carrier start to move up simultaneously with the presser bar and its carrier and are rising during the first ten degrees, when they dwell in their highest position from ten degrees to one hundred and fifty degrees and move downward from one hundred and fifty degrees to one hundred and ninety-five degrees and dwell in their lowest position from one hundred and ninety-five degrees to three hundred and fifteen degrees when they again commence to rise, and continue such movement during the remainder of the complete revolution of the cam shaft. The receiving plate is moving downward and inwardly during the first twenty degrees, when it dwells in its downward position from twenty degrees to one hundred and seventy-five degrees. It then moves upward to its normal position from one hundred and seventy-five degrees to two hundred and twenty degrees and dwells in that position from two hundred and twenty degrees to three hundred and forty degrees when it again commences to move down and continues such movement during the remainder of the complete revolution of the cam shaft. The carrier fly frame dwells during the first sixty degrees moves inwardly from sixty degrees to one hundred and twenty degrees, dwells in its inward position from one hundred and twenty degrees to one hundred and forty degrees, returns outwardly from one hundred and forty degrees to two hundred and twenty-five degrees, and dwells in its outward position from two hundred and twenty-five degrees to two hundred and eighty degrees when it returns to its original position from two hundred and eighty-five degrees to three hundred and twenty-five degrees and dwell in that position during the remainder of the revolution of the cam shaft. The holder fly frame dwells in its normal vertical position during the first ninety degrees and rocks inwardly from ninety degrees to one hundred and sixty degrees, dwells from one hundred and sixty degrees to one hundred and ninety-five degrees, and rocks outwardly back to its normal position from one hundred and ninety-five degrees to two hundred and seventy degrees and dwells the remainder of the revolution of the cam shaft. The knocker arms dwell in their highest position during the first five degrees, move downwardly from five degrees to forty-five degrees, dwell in their lowest position from forty-five degrees to seventy degrees and return from seventy degrees to one hundred and thirty degrees and dwell the remainder of the revolution of the cam shaft.

It is to be understood that the present invention is not limited to the particular construction and operation of devices hereinbefore set forth, as it is obvious that many changes, modifications and omissions may be made without departing from the essential characteristics thereof. Neither is the invention limited to the particular form of book carrier herein described, as any mechanical arrangement by which the books are grasped and carried onward to the different covering instrumentalities in succession may be employed. The employment of the carrier-driver herein described is not deemed essential as any other driver adapted to perform the function of properly driving the carrier may be substituted for that shown.

No claim is herein made broadly to the revoluble or intermittently revoluble book carrier provided with one or more grasping devices, as the same is patented to Smith and Arnold, No. 449,595, dated March 31, 1891. Neither is claim herein made to the adhesive material feeding device herein described, nor to the treadles and connections with the belt tightener pulley as they each form the subject matter of separate applications for Letters Patent respectively January 9, 1890, Serial No. 336,410, and November 24, 1891, Serial No. 412,931, filed by me.

What I claim is—

1. The herein described method of covering books and the like which consists first, in applying adhesive material to the back of the book, then presenting the cover in its flat condition thereto, then pressing the center of the cover onto the book back, then simultaneously smoothing and drying the back of the book and cover, and then folding the flaps of the cover against the sides of the book.

2. The herein described method of covering books and the like, which consists first in applying adhesive material to the back of the book, then presenting the cover in its flat condition thereto, then pressing the center of the cover onto the book-back, then breaking the cover around the edges of the book-back, then simultaneously smoothing and drying the back of the book and cover and then folding the flaps of the cover against the sides of the book.

3. The combination of a book carrier, means thereon to grasp a book, along its sides and retain it with its back projecting beyond the grasping device, a cementing device for the book back, a support for the covers, a cover feeder for carrying a cover from said support to the book-back, and a presser for pressing the cover and book-back together, substantially as described.

4. The combination in a book covering machine, of a cementing device for the book back, a cover-feeder, a presser for uniting the cover to the book back, with a book-carrier having a grasping device grasping a book along its sides to allow its back to project beyond said grasping device, and means whereby the carrier is moved constantly forward step by step to present the back successively to the cementing device, cover feeder and presser devices, substantially as described.

5. The combination of a book-carrier, means for revolving said carrier, means on said carrier to grasp a book, a cementing device for the book-back, a support for the covers, a cover feeder, means for vibrating the cover feeder to carry a cover from said support into covering position, and a presser for pressing the book-back and cover together, substantially as described.

6. The combination in a book covering machine, of a cementing device for the book backs, a cover-feeder, a presser for pressing the book-backs and covers together, with a book-carrier having a plurality of grasping devices each to grasp a book along its sides and to allow the backs to project beyond said grasping devices and means whereby the carrier is moved constantly forward step by step to present the book-backs successively to the cementing device, cover feeder and pressing devices, substantially as described.

7. The combination of a movable book-carrier, means thereon to grasp a book and retain it while moving onward to the point of delivery, a cementing device to apply cement to the back of the moving book, a cover feeder, means for moving the feeder across the path of the carrier, and a presser for pressing book back and cover together, substantially as described.

8. The combination of a movable book carrier, means thereon to grasp a book, a cementing device to apply cement to the book back, a cover feeder, a presser for pressing the cover and book back together, and a breaker for breaking the cover around the edges of the book back, substantially as described.

9. The combination of a book carrier, means thereon to grasp a book, means to revolve the carrier intermittently, a cementing device to apply cement to the book-back, a cover feeder, a presser to press the book back and cover together, and a breaker to break the cover around the edges of the book-back, substantially as described.

10. The combination of a book-carrier, means thereon to grasp a book, a cementing device to apply cement to the book-back, a cover feeder, means for moving the feeder across the path of the carrier, a presser, and means for vertically reciprocating said presser to press the cover and book-back together, substantially as described.

11. The combination of a book carrier, means thereon to grasp a book, a cementing device to apply cement to the book-back, a cover feeder, a vertically reciprocating presser for uniting the cover and book-back, and a vertically reciprocating breaker for breaking the cover around the edges of the book-back, substantially as described.

12. In a book covering machine, the combination of cementing, cover-feeding, and pressing devices to cement, feed, and attach a cover to the book-back, a breaker for breaking the cover around both of the corners of the book-back, and means for vertically reciprocating the breaker, with a book-carrier having a grasping device to grasp a book along the sides with its back projecting beyond said grasping device and retain such book until after the operation of the breaker, substantially as described.

13. In a book covering machine, the combination of cementing, cover-feeding, and pressing devices to cement, feed, and attach a cover to the book-back, a breaker for breaking the cover around both of the corners of the book back, and means for moving the breaker, with a book carrier having a grasping device to grasp a book along its sides with its back projecting beyond said grasping device and retain such book until after the operation of the breaker, and means whereby the carrier is moved constantly forward step by step to present the back successively to the cementing, cover feeding, pressing and breaker devices, substantially as described.

14. The combination of a book carrier means thereon to grasp a book, a cementing device to apply cement to the book-back, a cover feeder, a presser for pressing the cover and book-back together, a breaker for breaking the cover around the edges of the book-back, and a smoothing device for contact with the book-back and cover, substantially as described.

15. The combination in a book covering machine, of a book carrier having a plurality of grasping devices mounted therein, cover attaching devices, a cover-smoothing device, and delivery devices for the covered book, occupying definite successive positions along the path of the book-carrier, with an operating driver and gearing interposed between the driving shaft and the book-carrier to intermittently operate said driver and carrier, the number of stops made by the driver in a given time corresponding to the grasping devices which are moved step by step from a book feeding position in said given time, so that each stoppage of the carrier places a grasping device adjacent to said cover attaching, cover smoothing, and delivery devices, whereby the books are retained in position to be acted upon sequentially, substantially as described.

16. In an organized machine for covering books, the combination of an intermittently revoluble book carrier, a plurality of grasping devices thereon, a cover feeder adapted to feed a cover in position before or simultaneous with each dwell of the book carrier, and a presser for pressing the book-back and cover together during the dwell of the book carrier, substantially as described.

17. In an organized machine for covering books, the combination of an intermittently revoluble book carrier, a plurality of grasping devices therein, a cover feeder adapted to feed a cover in position before or simultaneous with each dwell of the book carrier, a presser for pressing the cover and book-back together during the dwell of the book carrier, and a breaker for breaking the cover around the corners of the book-back during the dwell of the book carrier, substantially as described.

18. The combination of a book carrier means thereon to grasp a book, a pivoted book holder, and a pin projecting from the carrier for swinging the holder to one side to permit a book to be fed to the book carrier, substantially as described.

19. The combination of a book carrier, a plurality of grasping devices therein, a pivoted book holder, common to said grasping devices and a plurality of pins for contact with the holder to move it to one side to permit a book to be fed into each of the grasping devices, substantially as described.

20. The combination of a book carrier provided with means to grasp a book along its sides and retain it with its back projecting beyond said grasping means, means for moving the carrier constantly forward step by step, a rotating glue brush supported in a fixed position with respect to the carrier for applying glue to the back of the book, a cover feeder and means for attaching the cover to the book, substantially as described.

21. The combination of a book carrier means thereon to grasp a book, a temporary holder, means carried by a moving part for moving the holder to one side to allow a book to be fed to the carrier, and a supporting gage for determining the position of the book with respect to the carrier, substantially as described.

22. The combination of a book carrier, provided with means to grasp a book along its sides with its back projecting beyond the grasping means, means for constantly moving said carrier forward step by step, a cover feed table, a movable feeding device for carrying the covers from the feed table and presenting them in position to the book back, substantially as described.

23. The combination of a book carrier, means thereon to grasp a book, a cover feed table, a cover feeder for taking the covers from the feed table and presenting them in position to the book back, and means for vibrating the cover feeder, substantially as described.

24. The combination of a book carrier means thereon to grasp a book, a cover feed table, vibrating arms having grippers for taking the cover from the feed table and presenting it in position to the book-back, and means for operating the grippers to grip and release the cover, substantially as described.

25. The combination of a book carrier means thereon to grasp a book, a cover feed table, vibrating arms having grippers for taking the cover from the feed table and presenting it to the book-back, and a position rod for holding the grippers in substantially a horizontal position during the vibration of said arms, substantially as described.

26. The combination of a book carrier means thereon to grasp a book, a traveling cover feeder adapted to present a cover in proper position to the book, and means for regulating the travel of the cover feeder to adjust the center of the cover to the book-back, substantially as described.

27. The combination of a book carrier means thereon to grasp a book, a cover feed table, a cover feeder for taking the cover from the table and presenting it to the book-back and having a constant range of movement in one direction, and means for varying the range of movement of the cover feeder in the other direction, substantially as described.

28. The combination of a book carrier means thereon to grasp a book, a cover feed table, a vibrating cover feeder for taking the cover and presenting it in position to the book, and a radius rod adjustably connected to the cover feeder, substantially as described.

29. The combination of the vibrating gripper arms an operating cam imparting a constant range of movement, a radius rod interposed between the cam and a gripper arm and adjustably connected to the latter for varying the arc of vibration of the gripper arms, substantially as described.

30. The combination of vibrating gripper arms a gripper rock-shaft carrying a gripper jaw, a gripper sleeve surrounding said rock shaft and carrying the other jaw, means for holding the sleeve in a determined position with respect to the rock shaft, and a tripper for rocking the rock shaft, substantially as described.

31. The combination of vibrating gripper arms, a gripper rock shaft carrying a gripper jaw, a gripper sleeve surrounding said rock shaft and carrying the other jaw, a position rod for holding the gripper jaws in a determined position in the vibration of the gripper arms, and for holding the gripper sleeve fixed with respect to the rock shaft, substantially as described.

32. The combination of a presser stand, a presser bar carrier, a pair of links connecting the carrier to the stand and a presser bar seated at the upper end of the carrier, substantially as described.

33. The combination of a breaker stand, a breaker carrier, a pair of links connecting the carrier with the stand, and a pair of breaker-jaws pivotally connected to the carrier, substantially as described.

34. The combination of a breaker carrier, a pair of breaker jaws pivotally mounted thereto, and a double faced wedge for holding the jaws in contact with the book and for releasing them to permit them to leave the book, substantially as described.

35. The combination of a breaker-carrier, a pair of breaker jaws pivotally connected to the carrier, a presser-bar-carrier and a double-faced wedge carried by said presser carrier for holding the breaker jaws in contact with the book, and releasing them to move from the book, substantially as described.

36. The combination of a presser-carrier and a removable presser bar secured thereto, a breaker-carrier, a pair of jaws secured to said carrier and means for adjusting one of the jaws with respect to the other and to the presser bar, substantially as described.

37. The combination of a movable book carrier, with means thereon to grasp a book, a fixed trough, and a smoothing plate adjustably mounted in said trough, substantially as described.

38. The combination of a movable book carrier, with means thereon to grasp a book, a fixed trough, a smoothing plate adjustably mounted in said trough, and means for heating the plate, substantially as described.

39. The combination of a book-carrier, having means to grasp a book, with its back projecting beyond the grasping means, a cementing device, a presser-bar having a definite range of movement, a smoothing plate, and means for adjusting it with respect to the surface of the carrier, substantially as described.

40. The combination of a book-carrier having a grasping device to grasp a book, a delivery bracket having an opening through which the covered book is delivered, means for opening the grasping device, and a receiving plate to close said opening of the delivery bracket, substantially as described.

41. The combination of a book carrier means thereon to grasp a book, having its cover flap unfolded, a delivery bracket having an opening through which the covered book is delivered, whereby the cover flaps are folded against the sides of the book a receiving plate controlling such opening, and a knocker to insure the delivery of the book, substantially as described.

42. The combination of an intermittently rotating book carrier, a plurality of grasping devices therein, a cementing device, a cover feeder, a presser for pressing the cover onto the book back, breaker jaws for breaking the cover around the corners of the book-back, a smoothing plate for contact with the book-back and cover, a delivery bracket having an opening for the passage of the covered book, and a delivery fly frame, substantially as described.

43. The combination of a book carrier means thereon to grasp a book and carry to the point of delivery, and a guide way for the projecting leaves of the book, extending from the book receiving station to the point of delivery, substantially as described.

44. The combination in a book binding machine, of a book carrier having a plurality of devices to grasp and retain the book, with the back protruding beyond said devices while being carried onward, and a stationary elongated flat smoothing plate extending along the path of the carrier along and over which the book-backs are carried.

45. In a book covering machine, the combination of a book grasping device, a presser for pressing the cover against the back of the book, means for moving the presser, substantially at right angles to the plane of the back of the book, and a pair of breakers adapted to break the cover against the sides of the book, substantially as described.

46. The combination with a grasping device and an end gage for determining the position of the end of the book in said grasping device, of a cover feed table having an adjustable cover-head gage adjustable with respect to the position of the end of the book in the grasping device, means for moving the grasping device with the end of the book in alignment with the cover-head gage, a cover feeder for carrying the cover from the feed table to a position below the book back, and means for attaching the cover to the book back.

47. The combination of a book carrier having a grasping device consisting of a fixed jaw and a movable jaw, a lever pivoted at one end to the carrier and at the other end pivoted to and carrying the movable jaw, a cam roll carried by said lever, coincident with its pivotal connection with the movable jaw a spring for constantly pressing the movable jaw toward the fixed jaw, and a cam for moving the movable jaw from the fixed jaw against the force of said spring, substantially as described.

In testimony whereof I have set my hand, this 23d day of December, 1889, in the presence of two witnesses.

HORACE L. ARNOLD.

Witnesses:
GEO. H. GRAHAM,
NETTIE MARLER.